US008875187B2

(12) United States Patent
Ellis et al.

(10) Patent No.: US 8,875,187 B2
(45) Date of Patent: *Oct. 28, 2014

(54) ELECTRONIC TELEVISION PROGRAM GUIDE SCHEDULE SYSTEM AND METHOD WITH SCAN FEATURE

(75) Inventors: Michael D. Ellis, Boulder, CO (US); Bruce L. Davis, Lake Oswego, OR (US); Edward B. Knudson, Littleton, CO (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/632,047

(22) Filed: Dec. 7, 2009

(65) Prior Publication Data

US 2010/0180302 A1 Jul. 15, 2010

Related U.S. Application Data

(63) Continuation of application No. 10/225,526, filed on Aug. 20, 2002, now abandoned, which is a continuation of application No. 09/317,687, filed on May 24, 1999, now Pat. No. 6,470,497, which is a continuation of application No. 08/675,082, filed on Jul. 3, 1996, now Pat. No. 5,986,650.

(51) Int. Cl.
*H04N 5/445* (2011.01)
*G06F 13/00* (2006.01)
*G06F 3/00* (2006.01)
*H04N 21/431* (2011.01)
*H04N 21/482* (2011.01)
*H04N 21/472* (2011.01)
*H04N 21/422* (2011.01)

(52) U.S. Cl.
CPC ....... *H04N 21/4312* (2013.01); *H04N 5/44543* (2013.01); *H04N 21/4221* (2013.01); *H04N 21/482* (2013.01); *H04N 21/47214* (2013.01)
USPC .......................................... 725/52

(58) Field of Classification Search
None
See application file for complete search history.

*Primary Examiner* — Nathan Flynn
*Assistant Examiner* — Omar S Parra
(74) *Attorney, Agent, or Firm* — Ropes & Gray LLP

(57) ABSTRACT

An electronic program schedule system which utilizes a receiver for receiving broadcast, satellite or cablecast television programs for a plurality of television channels and a tuner for tuning a television receiver to a selected one of the plurality of channels. A data processor receives and stores in a memory television program schedule information for a plurality of television programs to appear on the plurality of television channels. A user control apparatus, such as a remote controller, is utilized by a viewer to choose user control commands and transmit signals in response to the data processor which receives the signals in response to user control commands. A television receiver is used to display the television programs and television program schedule information. A video display generator receives video control commands from the data processor and program schedule information from the memory and displays a portion of the program schedule information in overlaying relationship with a television program appearing on a television channel in at least one mode of operation of the television programming guide. The data processor controls the video display generator with video control commands, issued in response to the user control commands, to display program schedule information for any chosen one of the plurality of television programs in overlaying relationship with at least one television program then appearing on any chosen one of the plurality of channels on the television receiver. The system includes a scan feature to permit the user to scan program schedule listings for multiple programs in any of the operational modes of the system with the issuance of a single user control command.

22 Claims, 24 Drawing Sheets

(56) References Cited

U.S. PATENT DOCUMENTS

| | | | |
|---|---|---|---|
| 4,170,782 A | 10/1979 | Miller | |
| 4,355,415 A | 10/1982 | George et al. | |
| 4,375,651 A | 3/1983 | Templin et al. | |
| 4,392,247 A | 7/1983 | van Deursen | |
| 4,495,654 A | 1/1985 | Deiss | |
| 4,566,034 A | 1/1986 | Harger et al. | |
| 4,706,121 A | 11/1987 | Young | |
| 4,746,983 A | 5/1988 | Hakamada | |
| 4,776,038 A | 10/1988 | Testin et al. | |
| 4,870,492 A | 9/1989 | Hakamada et al. | |
| 4,959,719 A | 9/1990 | Strubbe et al. | |
| 4,959,720 A | 9/1990 | Duffield et al. | |
| 4,965,825 A | 10/1990 | Harvey et al. | |
| 4,969,209 A | 11/1990 | Schwob | |
| 5,045,947 A | 9/1991 | Beery | |
| 5,068,734 A | 11/1991 | Beery | |
| 5,182,646 A | 1/1993 | Keenan | |
| 5,194,954 A | 3/1993 | Duffield | |
| 5,210,611 A | 5/1993 | Yee et al. | |
| 5,251,034 A | 10/1993 | Na | |
| 5,296,931 A | 3/1994 | Na | |
| 5,317,403 A | 5/1994 | Keenan | |
| 5,323,240 A | 6/1994 | Amano et al. | |
| 5,353,121 A | 10/1994 | Young et al. | |
| 5,371,550 A | 12/1994 | Shibutani et al. | |
| 5,408,692 A | 4/1995 | Suzuki et al. | |
| 5,453,796 A | 9/1995 | Duffield et al. | |
| 5,479,266 A | 12/1995 | Young et al. | |
| 5,479,268 A | 12/1995 | Young et al. | |
| 5,517,254 A | 5/1996 | Monta et al. | |
| 5,532,754 A | 7/1996 | Young et al. | |
| 5,557,338 A | 9/1996 | Maze et al. | |
| 5,583,560 A | 12/1996 | Florin et al. | |
| 5,589,892 A | 12/1996 | Knee et al. | |
| 5,596,373 A | 1/1997 | White et al. | |
| 5,614,940 A | 3/1997 | Cobbley et al. | |
| 5,629,733 A | 5/1997 | Youman et al. | |
| 5,635,978 A * | 6/1997 | Alten et al. | 725/42 |
| 5,659,367 A | 8/1997 | Yuen | |
| 5,673,089 A | 9/1997 | Yuen et al. | |
| 5,800,768 A | 9/1998 | Kim et al. | |
| 5,801,787 A | 9/1998 | Schein et al. | |
| 5,805,763 A | 9/1998 | Lawler et al. | |
| 5,808,608 A * | 9/1998 | Young et al. | 725/52 |
| 5,818,541 A | 10/1998 | Matsuura et al. | |
| 5,822,123 A | 10/1998 | Davis et al. | |
| 5,883,680 A * | 3/1999 | Nykerk | 348/734 |
| 5,886,746 A | 3/1999 | Yuen et al. | |
| 5,892,498 A | 4/1999 | Marshall et al. | |
| 5,900,916 A | 5/1999 | Pauley | |
| 5,907,323 A | 5/1999 | Lawler et al. | |
| 5,933,192 A | 8/1999 | Crosby et al. | |
| 5,986,650 A | 11/1999 | Ellis et al. | |
| 6,016,108 A | 1/2000 | Terk et al. | |
| 6,016,141 A | 1/2000 | Knudson et al. | |
| 6,025,837 A | 2/2000 | Matthews et al. | |
| 6,072,535 A | 6/2000 | Kearns | |
| 6,078,348 A | 6/2000 | Klosterman et al. | |
| 6,151,059 A | 11/2000 | Schein et al. | |
| 6,177,931 B1 | 1/2001 | Alexander et al. | |
| 6,226,444 B1 | 5/2001 | Goldschmidt et al. | |
| 6,226,618 B1 | 5/2001 | Downs et al. | |
| 6,239,794 B1 | 5/2001 | Yuen et al. | |
| 6,323,911 B1 | 11/2001 | Schein et al. | |
| 6,324,338 B1 | 11/2001 | Wood et al. | |
| 6,341,374 B2 | 1/2002 | Schein et al. | |
| 6,384,869 B1 | 5/2002 | Sciammarella et al. | |
| 6,388,714 B1 | 5/2002 | Schein et al. | |
| 6,407,049 B1 | 6/2002 | Willey et al. | |
| 6,418,556 B1 | 7/2002 | Bennington et al. | |
| 6,425,129 B1 | 7/2002 | Sciammarella et al. | |
| 6,445,306 B1 | 9/2002 | Trovato et al. | |
| 6,452,620 B1 | 9/2002 | Kapushinski et al. | |
| 6,470,497 B1 | 10/2002 | Ellis et al. | |
| 6,473,903 B2 | 10/2002 | Balakrishnan et al. | |
| 6,536,041 B1 | 3/2003 | Knudson et al. | |
| 6,563,515 B1 | 5/2003 | Reynolds et al. | |
| 6,564,378 B1 | 5/2003 | Satterfield et al. | |
| 6,614,987 B1 | 9/2003 | Maissel et al. | |
| 6,637,029 B1 | 10/2003 | Eilat et al. | |
| 6,651,253 B2 | 11/2003 | Dudkiewicz et al. | |
| 6,756,997 B1 | 6/2004 | Ward, III et al. | |
| 6,813,777 B1 | 11/2004 | Weinberger et al. | |
| 6,832,385 B2 | 12/2004 | Young et al. | |
| 6,833,878 B2 | 12/2004 | Takagi et al. | |
| 6,865,746 B1 | 3/2005 | Herrington et al. | |
| 6,868,225 B1 | 3/2005 | Brown et al. | |
| 6,874,152 B2 | 3/2005 | Vermeire et al. | |
| 6,897,904 B2 | 5/2005 | Potrebic et al. | |
| 6,898,762 B2 | 5/2005 | Ellis et al. | |
| 6,906,643 B2 | 6/2005 | Samadani et al. | |
| 6,934,964 B1 | 8/2005 | Schaffer et al. | |
| 6,978,310 B1 | 12/2005 | Rodriguez et al. | |
| 7,002,105 B2 | 2/2006 | Suzumi | |
| 7,003,791 B2 | 2/2006 | Mizutani | |
| 7,007,294 B1 | 2/2006 | Kurapati | |
| 7,013,478 B1 | 3/2006 | Hendricks et al. | |
| 7,047,547 B2 | 5/2006 | Alten et al. | |
| 7,055,166 B1 | 5/2006 | Logan et al. | |
| 7,062,777 B2 | 6/2006 | Alba et al. | |
| 7,096,185 B2 | 8/2006 | Reichardt et al. | |
| 7,100,185 B2 | 8/2006 | Bennington et al. | |
| 7,165,098 B1 | 1/2007 | Boyer et al. | |
| 7,206,892 B2 | 4/2007 | Kim et al. | |
| 7,213,089 B2 | 5/2007 | Hatakenaka | |
| 7,224,889 B2 | 5/2007 | Takasu et al. | |
| 7,227,583 B2 | 6/2007 | Sin | |
| 7,231,607 B2 | 6/2007 | Neely et al. | |
| 7,268,833 B2 | 9/2007 | Park et al. | |
| 7,283,992 B2 | 10/2007 | Liu et al. | |
| 7,296,284 B1 | 11/2007 | Price et al. | |
| 7,313,805 B1 | 12/2007 | Rosin et al. | |
| 7,334,195 B2 | 2/2008 | Gemmel et al. | |
| 7,380,263 B2 | 5/2008 | Shintani | |
| 7,386,871 B1 | 6/2008 | Knudson et al. | |
| 7,458,093 B2 | 11/2008 | Dukes et al. | |
| 7,460,050 B2 | 12/2008 | Alvarado et al. | |
| 7,546,623 B2 | 6/2009 | Ramraz et al. | |
| 7,603,685 B2 | 10/2009 | Knudson et al. | |
| 7,610,010 B2 | 10/2009 | Onomatsu et al. | |
| 7,617,511 B2 | 11/2009 | Marsh | |
| 7,620,968 B2 | 11/2009 | Donnelly | |
| 7,689,556 B2 | 3/2010 | Garg et al. | |
| 7,738,765 B2 | 6/2010 | Matsuno et al. | |
| 7,748,018 B2 | 6/2010 | Young et al. | |
| 7,783,632 B2 | 8/2010 | Richardson et al. | |
| 7,793,319 B2 | 9/2010 | Anderson et al. | |
| 7,818,763 B2 | 10/2010 | Sie et al. | |
| 7,840,112 B2 | 11/2010 | Rao | |
| 7,895,193 B2 | 2/2011 | Cucerzan et al. | |
| 7,974,962 B2 | 7/2011 | Krakirian et al. | |
| 8,046,801 B2 | 10/2011 | Ellis et al. | |
| 8,095,951 B1 | 1/2012 | Kunkel et al. | |
| 2001/0053944 A1 | 12/2001 | Marks et al. | |
| 2002/0016971 A1 | 2/2002 | Berezowski et al. | |
| 2002/0049973 A1 | 4/2002 | Alten et al. | |
| 2002/0056119 A1 | 5/2002 | Moynihan | |
| 2002/0059595 A1 | 5/2002 | Goldschmidt Iki et al. | |
| 2002/0059610 A1 | 5/2002 | Ellis | |
| 2002/0075402 A1 | 6/2002 | Robson et al. | |
| 2002/0078453 A1 | 6/2002 | Kuo | |
| 2002/0104083 A1 | 8/2002 | Hendricks et al. | |
| 2002/0157099 A1 | 10/2002 | Schrader et al. | |
| 2002/0165770 A1 | 11/2002 | Khoo et al. | |
| 2002/0174430 A1 | 11/2002 | Ellis et al. | |
| 2002/0194600 A1 | 12/2002 | Ellis et al. | |
| 2003/0066077 A1 | 4/2003 | Gutta et al. | |
| 2003/0093790 A1 | 5/2003 | Logan et al. | |
| 2003/0093792 A1 | 5/2003 | Labeeb et al. | |
| 2003/0093803 A1 | 5/2003 | Ishikawa et al. | |
| 2003/0110499 A1 | 6/2003 | Knudson et al. | |
| 2003/0149621 A1 | 8/2003 | Shteyn | |
| 2003/0192061 A1 | 10/2003 | Hwangbo et al. | |
| 2003/0196201 A1 | 10/2003 | Schein et al. | |

| | | | |
|---|---|---|---|
| 2004/0003394 A1 | 1/2004 | Ramaswamy |
| 2004/0003399 A1 | 1/2004 | Cooper |
| 2004/0019908 A1 | 1/2004 | Williams et al. |
| 2004/0027485 A1 | 2/2004 | Kubota et al. |
| 2004/0064835 A1 | 4/2004 | Bellwood et al. |
| 2004/0103434 A1 | 5/2004 | Ellis |
| 2004/0111741 A1 | 6/2004 | DePietro |
| 2004/0117831 A1 | 6/2004 | Ellis et al. |
| 2004/0177370 A1 | 9/2004 | Dudkiewicz |
| 2004/0210926 A1 | 10/2004 | Francis et al. |
| 2004/0210932 A1 | 10/2004 | Mori et al. |
| 2004/0244051 A1 | 12/2004 | Kim et al. |
| 2004/0268413 A1 | 12/2004 | Reid et al. |
| 2005/0028208 A1 | 2/2005 | Ellis et al. |
| 2005/0102696 A1 | 5/2005 | Westberg |
| 2005/0108754 A1 | 5/2005 | Carhart et al. |
| 2005/0117030 A1 | 6/2005 | Kim |
| 2005/0120373 A1 | 6/2005 | Thomas et al. |
| 2005/0160461 A1 | 7/2005 | Baumgartner et al. |
| 2005/0188402 A1 | 8/2005 | de Andrade et al. |
| 2005/0204388 A1 | 9/2005 | Knudson et al. |
| 2005/0229215 A1 | 10/2005 | Schein et al. |
| 2005/0246732 A1 | 11/2005 | Dudkiewicz et al. |
| 2005/0251827 A1 | 11/2005 | Ellis et al. |
| 2005/0259963 A1 | 11/2005 | Sano et al. |
| 2006/0026625 A1 | 2/2006 | Krakirian et al. |
| 2006/0026635 A1 | 2/2006 | Potrebic et al. |
| 2006/0026665 A1 | 2/2006 | Rodriguez et al. |
| 2006/0051059 A1 | 3/2006 | Krakirian et al. |
| 2006/0053449 A1 | 3/2006 | Gutta |
| 2006/0085828 A1 | 4/2006 | Dureau et al. |
| 2006/0101490 A1 | 5/2006 | Leurs |
| 2006/0149709 A1 | 7/2006 | Krakirian et al. |
| 2006/0174269 A1 | 8/2006 | Hansen-Turton |
| 2006/0218573 A1 | 9/2006 | Proebstel |
| 2006/0218604 A1 | 9/2006 | Riedl et al. |
| 2006/0253874 A1 | 11/2006 | Stark et al. |
| 2006/0271953 A1 | 11/2006 | Jacoby et al. |
| 2006/0294574 A1 | 12/2006 | Cha |
| 2007/0016875 A1 | 1/2007 | Santos-Gomez |
| 2007/0039023 A1 | 2/2007 | Kataoka |
| 2007/0055979 A1 | 3/2007 | Van Gassel et al. |
| 2007/0055989 A1 | 3/2007 | Shanks et al. |
| 2007/0074245 A1 | 3/2007 | Nyako et al. |
| 2007/0089132 A1 | 4/2007 | Qureshey et al. |
| 2007/0130089 A1 | 6/2007 | Chiu |
| 2007/0136749 A1 | 6/2007 | Hawkins et al. |
| 2007/0162850 A1 | 7/2007 | Adler et al. |
| 2007/0186240 A1 | 8/2007 | Ward et al. |
| 2007/0291175 A1 | 12/2007 | Hsieh |
| 2008/0092155 A1 | 4/2008 | Ferrone et al. |
| 2008/0092156 A1 | 4/2008 | Ferrone |
| 2008/0104057 A1 | 5/2008 | Billmaier et al. |
| 2008/0104127 A1 | 5/2008 | Billmaier et al. |
| 2008/0184294 A1 | 7/2008 | Lemmons et al. |
| 2010/0107194 A1 | 4/2010 | McKissick et al. |
| 2010/0175086 A1 | 7/2010 | Gaydou et al. |
| 2010/0180302 A1 | 7/2010 | Ellis |
| 2011/0164861 A1 | 7/2011 | Kunkel et al. |

FOREIGN PATENT DOCUMENTS

| | | |
|---|---|---|
| EP | 0 477 756 | 4/1992 |
| EP | 0512618 | 11/1992 |
| EP | 0 854 645 | 7/1998 |
| EP | 1363452 | 11/2003 |
| EP | 1 463 30 | 9/2004 |
| EP | 1 463 307 | 9/2004 |
| EP | 1641254 | 3/2006 |
| JP | 3178278 A | 8/1991 |
| WO | WO 96/07270 | 3/1996 |
| WO | WO 96-19074 | 6/1996 |
| WO | WO 96/19074 | 6/1996 |
| WO | WO 96/17473 | 9/1996 |
| WO | WO 97-50251 | 12/1997 |
| WO | WO 98-06219 | 2/1998 |
| WO | WO 98-38831 | 9/1998 |
| WO | WO 99-45702 | 9/1999 |
| WO | WO 00-11869 | 3/2000 |
| WO | WO-0011869 | 3/2000 |
| WO | WO 00-33573 | 6/2000 |
| WO | WO 00-33576 | 6/2000 |
| WO | WO 01-76249 | 10/2001 |
| WO | WO 01-91458 | 11/2001 |

OTHER PUBLICATIONS

Karl Tetzner, Die Datenseile—und wie man sie nutzen konnte Funkschau 1975, issue 4, p. 3.

Patent Abstracts of Japan; vol. 16, No. 233 (E-1209), May 28, 1992 and JP 04 044475 A (Victor), Feb. 14, 1992.

Van Barneveld et al., "Designing Usable Interfaces for TV Recommender Systems," Personalized Digital Television, 6:259-286 (2004).

* cited by examiner

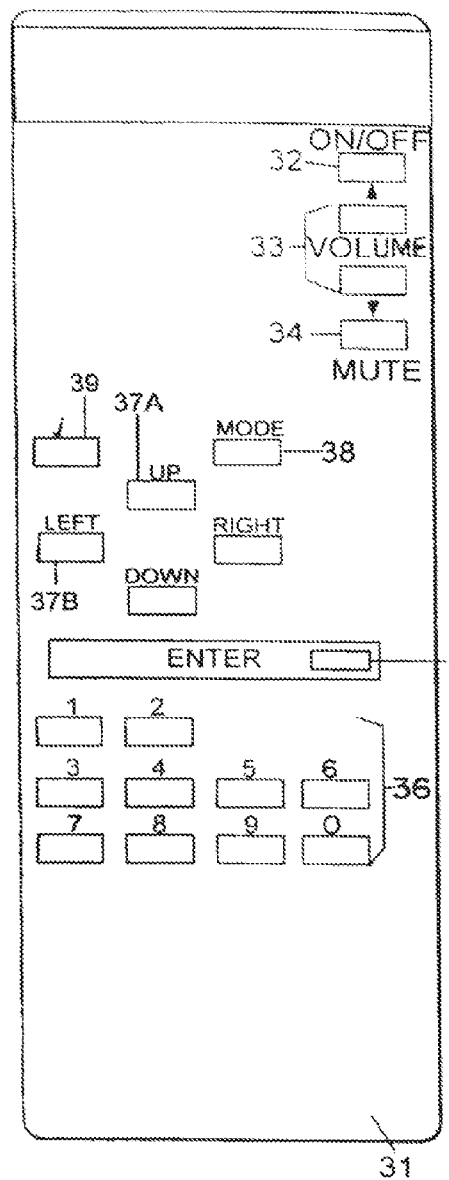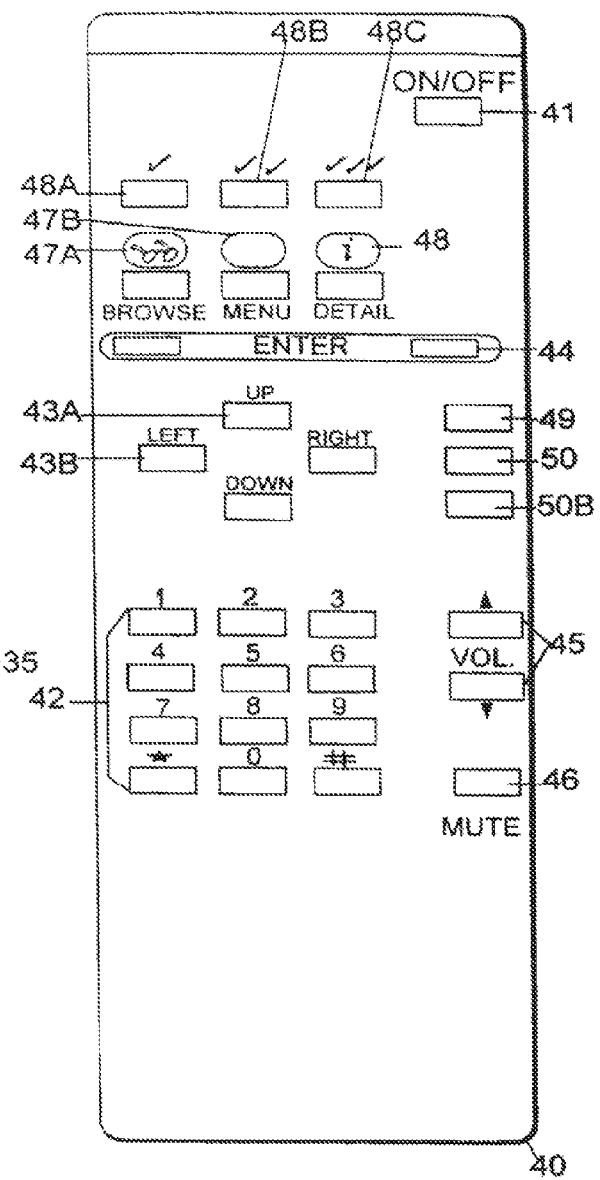
*FIG.3*  *FIG.4*

BROWSE MODE SCAN

PRESS ☐1 FOR CHANNEL SCAN.

PRESS ☐2 FOR TIME SCAN.

*FIG.10*

ELECTRONIC TELEVISION PROGRAM GUIDE SCHEDULE SYSTEM AND METHOD WITH SCAN FEATURE

CROSS-REFERENCE TO RELATED APPLICATIONS

This application is a continuation of U.S. patent application Ser. No. 10/225,526, filed Aug. 20, 2002, now abandoned, which is a continuation of U.S. patent application Ser. No. 09/317,687, filed May 24, 1999, now U.S. Patent No. 6,470,497, which is a continuation of U.S. patent application Ser. No. 08/675,082, filed Jul. 3, 1996, now U.S. Patent No. 5,986,650, each of which is hereby incorporated by reference herein in its respective entirety.

BACKGROUND OF THE INVENTION

This invention relates to an electronic program schedule system, which provides a user with schedule information for broadcast or cablecast programs viewed by the user on a television receiver. More particularly, it relates to an improved electronic program guide that provides the user with a more powerful and convenient operating environment, while, at the same time, increasing the efficiency of navigation by the user through the guide. Most particularly, it relates to an improved EPG having a scan feature. The EPG scan feature causes television programs and/or items of program schedule information to be displayed seriatim, each for a fixed time. The feature may be turned off at any point during the scan, whereupon, as described below, the user may either continue to view the then-displayed program or schedule information, or return to the program or schedule information displayed at the time the scan was initiated.

Electronic program guides for television systems are known in the art. For example, one prior system used an electronic character generator to display textual schedule information on the full screen of a television receiver. Other prior systems presented electronically stored program schedule information to a user for viewing while allowing the user to select display formats. Still other systems employed a data processor to input user-selection criteria, then stored only the program schedule information meeting these criteria, and subsequently used the stored information to automatically tune a programmable tuner or activate a recording device at the time of broadcast of the selected television programs. Such prior systems are generally discussed in. "Stay Tuned for Smart TV," published in the November 1990 issue of *Popular Science*.

Collectively, the prior electronic program systems may be difficult to implement and cumbersome to use. They also fail to provide viewing capabilities that address in a more realistic manner the viewing habits of the users of these electronic program systems. Moreover, many of these systems are complex, in their design and are expensive to implement. Ease of use and economy are primary concerns of television program distributors and viewers as they contemplate dramatic increases in the number and nature of program networks and other television-based services. And, as the number of television channels available to a user increases dramatically with the advent of new satellite and cable-based technologies, the utility of these prior systems substantially diminishes.

The prior electronic program guides also lack a method for creating a viewing itinerary electronically while still viewing a program currently appearing on the television receiver. Moreover, these prior program guides leave much guess work for the user as he navigates through a sequence of channels. When skimming through channels to ascertain the program then being displayed on any channel, commonly known as "channel surfing," the user needs to guess which program is currently being aired from the video encountered as the user surfs through the channels. Since much—in some cases, up to 30%—of the programming appearing on any given channel at any given time is advertising or other commercial programming, the user is not provided with any clues as to what program is appearing on a selected channel at a given time and must therefore wait until the advertisement or commercial is over before ascertaining the program then appearing on the selected channel. Thus a need exists for a program guide which displays current program schedule information for each channel as the user surfs through the available channels.

Accordingly, there is a need in the art for a simplified electronic program schedule system that may be more easily implemented, and which is appealing and efficient in operation. There is also a need to provide the user with an electronic program schedule system that displays both broadcast programs and electronic schedule information in a manner not previously available with other electronic program schedule systems, particularly those using a remote controller.

The present invention is directed to the incorporation of a "scan" feature into an EPG. Such a scan feature is useful to automatically cycle through a plurality of programs currently being received on a plurality of channels, or a plurality of program schedule information in any of the various operating modes of an EPG as described below.

Certain scan features are known in the audio field, particularly in automobile radios to permit a user to sample the radio programs being received on a number of stations in a hands-free manner with the single touch of a button. Once a radio's scan feature has been enabled, the radio tunes to each receivable radio station on the tuning band, in order, beginning at the presently tuned station and stopping for a preset time at each station before moving to the next. When the driver or other listener wishes the radio to remain tuned to a particular one of the scanned stations, the scan function is deactivated and listening returns to normal.

In addition, some remote control devices for television, such as the Uniwand™ sold by Universal Electronics, include a "scan" key. When this key is pressed, the remote control device emits a stream of infrared signals at predetermined time intervals to cause the television tuner to sequentially tune to the next channel. However, because the signals are transmitted by the remote control device, the user must keep the device aimed at the infrared receiver throughout the scan process so that the infrared signals continue to be received by the television. This is awkward and cumbersome.

However, existing EPGs do not provide for user-controllable scanning of programs or program schedule information, which are desirable features in an EPG because the user need not manually scan, or "surf," through programs or schedule information by continually depressing a channel or direction arrow key on a remote controller.

Accordingly, it is an object of the present invention to incorporate a scan feature into an EPG.

It is a further object of the present invention to incorporate the scan feature into the various operating modes of the EPG.

A still further object of the present invention is to incorporate a scan feature into of an EPG such that a user can scan through actual television programs or program schedule information.

A still further object of the invention is to obviate the requirement for a user to keep the remote control device aimed at the television to perform a scan operation.

These and other objects of the invention are achieved by an electronic program schedule system which includes a receiver for receiving broadcast, satellite or cablecast television programs for a plurality of television channels and a tuner for tuning a television receiver to a selected one of the plurality of channels. A data processor receives and stores in a memory television program schedule information for a plurality of television programs to appear on the plurality of television channels. A user control apparatus, such as a remote controller, is utilized by a viewer to choose user control commands and transmit signals in response to the data processor which receives the signals in response to user control commands. A television receiver is used to display the television programs and television program schedule and other information. A video display generator receives video control commands from the data processor and program schedule information from the memory and displays a portion of the program schedule information in either full screen mode or in overlaying relationship with a television program appearing on a television channel in at least one mode of operation of the television programming guide. The data processor controls the video display generator with video control commands, issued in response to the user control commands, to display program schedule information for any chosen one of the plurality of television programs in either full screen mode or in overlaying relationship with at least one television program then appearing on any chosen one of the plurality of channels on the television receiver.

In response to a single user control command, the data processor causes the tuner to scan channels and/or program schedule information seriatim. For example, in one mode of operation of the EPG of the present invention—referred to as FLIP mode and described more fully below—the data processor causes the tuner to increment (or decrement) by one the currently tuned channel, display the received program for the channel together with program schedule information identifying the program for a predetermined amount of time, and then increment (or decrement) by one the channel, display that channel and associated program schedule information for the predetermined amount of time, and so on, until a second user control command causes the tuner to stop scanning and remain on the currently tuned channel, or until the data processor otherwise causes the tuner to stop the scan. Similarly, in another mode of operation of the EPG of the present invention—referred to as BROWSE mode and described more fully below—the scan feature may be used to scan program schedule information (on either a channel or time basis) while the tuner remains tuned to the same channel.

In addition, the scan feature of the present invention may also be used in modes of an EPG that display full pages of program schedule information to permit a user to scan through the program schedule information with a single user control command.

BRIEF DESCRIPTION OF THE DRAWINGS

FIG. 3 depicts a remote controller that can be used in connection with the electronic program guide system of the present application.

FIG. 4 depicts an alternative embodiment of the remote controller shown in FIG. 3.

FIG. 10 shows a screen used in one embodiment of the present invention to permit a user to select a channel-wise or time-wise scan in the BROWSE mode of operation of one embodiment of the present invention.

DETAILED DESCRIPTION OF THE INVENTION

System Configuration

Figure 1:
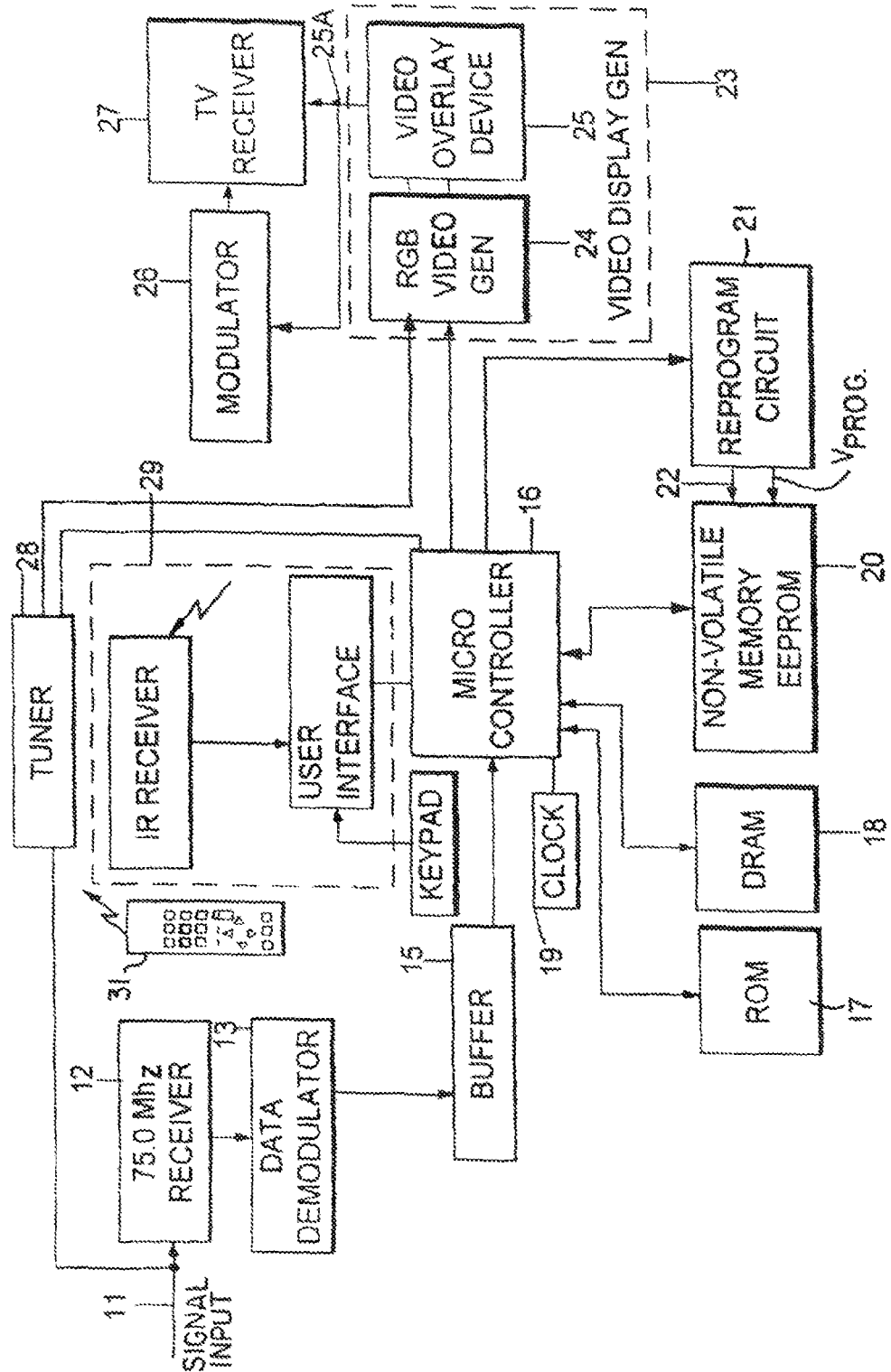
FIG. 1 is a block diagram showing various components of the preferred embodiment of the invention herein.

FIG. 1 is a block diagram showing various components of the electronic program schedule system generally designated as 10. Physically, these system components can be located in a user's set-top cable converter box or other signal reception or processing device, such as a satellite receiver. Alternatively, the components can be mounted in a separate housing, or included as part of a television receiver, VCR, personal computer, or multimedia player; or reside as a distributed application in a broadband network architecture.

An input signal 11 is connected to a receiver 12, which receives a transmitted data stream from a data provider. The data stream may contain, for example, information about programs or services available in a particular market, geographical or otherwise. The input signal 11 can originate, for example, as part of a standard broadcast, cablecast or satellite transmission, or other form of data transmission. The data provider is a program information provider, the satellite uplink manager, a local cable operator, or a combination of these sources, and the data stream contains program schedule information for all television programs and other services available in the operator's geographical market.

The data stream may be modulated and then transmitted on the cable line in any number of ways, including as part of a dedicated channel transmission operating at a frequency of, for example, 75 MHz. Those of skill in the art will understand that numerous other transmission schemes can be used to transmit the data stream, such as embedding it in the vertical blanking interval of a program broadcast signal. As will be discussed in greater detail below, according to the present invention, the transmitted data stream may additionally contain application software for implementing or updating the electronic program guide at the user site.

The transmitted program schedule data or application software is received by the receiver 12 on signal input line 11. The received signal is passed from the receiver to a data demodulator 13, such as a QPSK demodulator or a GI Info-Cipher 1000R, which demodulates the transmission and passes it to a buffer 15.

A microcontroller 16, such as a M68000EC, receives data passed to the buffer 15. Bootstrap operating software, which may be used for capturing electronic program guide application software updates, is stored in a read only memory (ROM) 17. The microcontroller 16 uses the received program schedule information to build a database by storing the data in appropriately organized records in dynamic random access memory (DRAM) 18. The stored schedule information can be updated on a periodic basis, such as hourly, daily or weekly, or at any time when changes in scheduling or other factors warrant an update. The system also includes a system clock 19.

Alternatively, the program schedule information could be supplied in a ROM, disk or other non-volatile memory, or it could be downloaded to a storage disk or other data storage device. The invention herein is not directed to the particular method of transmission or reception of the schedule information.

If the microcontroller 16 recognizes the received data as application software which controls the program schedule system, as opposed to program schedule information, it stores it in non-volatile memory, such as an electrically erasable programmable ROM (EEPROM) 20 or battery-backed static RAM (SRAM). This configuration allows revised or replacement versions of the application software to be downloaded directly from the software developer to the user site through the cable or other transmission system.

In the case where an EEPROM is utilized, revised or replacement versions of the application software downloaded from the developer are first stored in DRAM 18 by the microcontroller 16, under direction of the downloading operating software stored in the ROM 17. The stored application software can then be checked for accuracy by, for example, a checksum analysis or other verification routine.

After the accuracy of the application software has been verified, the microcontroller 16 initiates a routine to re-program the EEPROM 20, where the application software is permanently stored. The microcontroller 16 will issue proper control commands to a reprogram circuit 21, which is adapted to supply the proper program voltage and logic control signals 22 required to erase and write to the EEPROM. It supplies this program voltage, Vprog, as well as any other required control signals, such as read or write enable, to the EEPROM 20 upon command from the microcontroller 16. After the EEPROM 20 has been electrically erased, the microcontroller 16 initiates transfer of the new application software from the DRAM 18 to the EEPROM 20 for storing.

When a battery-backed SRAM is utilized as non-volatile memory, the microcontroller stores the revised or replacement version of the application software downloaded from the developer directly in the SRAM, again under direction of the downloading operating software stored in the ROM. The stored application software can then be checked for accuracy by, for example, a checksum analysis or other verification routine.

When power is first applied to the system 10, the bootstrap operating software verifies that the program guide application software is resident in memory. If it is not resident, the bootstrap operating software waits for a download of the software. Once the application software is resident, the microcontroller 16 executes the application program software from a dedicated portion of the DRAM 18. Alternatively, the application software can be executed directly from the non-volatile memory 20. Under control of the program guide application software, the microcontroller 16 first verifies that the program schedule information is resident in DRAM 18. If it is not resident, the microcontroller waits for a download of the program schedule information, as discussed above. Alternatively, if the application program is resident in memory, but the database records containing the program schedule information data are not yet available, the application software can be configured to carry out other tasks, such as allowing the user to carry out functions not requiring the program schedule information data, as well as displaying an appropriate message indicating the database data is not yet available.

When the schedule system is operating, as discussed in greater detail hereinbelow, the microcontroller 16 takes the program schedule information stored in the DRAM 18 and, in conjunction with other downloaded data types such as stored bit maps for the screen configuration and the graphic symbol or logo displays stored in non-volatile memory 20 or, alternatively, in DRAM 18, supplies it to a video display generator (VDG) 23, which in the present embodiment may be a commercially available VGA-type graphics card, such as a Rocgen card manufactured by Roctec. The VDG includes a standard RGB video generator 24, which takes the digital program schedule information sent by the microcontroller 16 and converts it to an RGB format in accordance with the bit map for the particular screen display then being presented to the user on the television receiver 27. The configuration of each screen is shown and discussed in greater detail in the System Operation section below.

Figure 2:
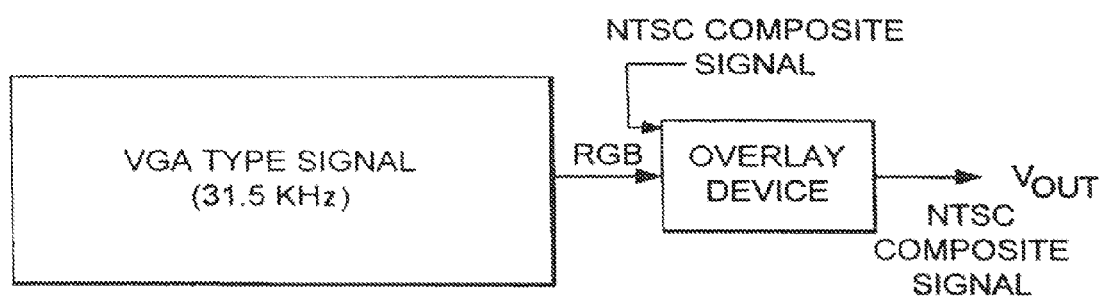
FIG. 2 is a block diagram showing the combination of program and schedule information by the video overlay device utilized in the present invention.

The VDG also includes a Video Overlay Device 25, which accepts the RGB video input, as well as an input from conventional television tuner 28, such as a conventional tuner manufactured by General Instrument or a Jerrold DPBB tuner, which supplies a program signal in standard NTSC video format. The overlay device 25 converts and combines the RGB signal with the signal from the tuner 28, and produces a composite NTSC output signal containing both the program signal and the program schedule information, as shown in FIG. 2. This composite video signal is supplied to a modulator 26, shown in FIG. 1, which can be a modulator such as available from Radio Shack, and then to the television receiver 27, which the user keeps tuned to the modulated channel, for example, channel 3 or 4. The composite video signal can also be supplied directly to the television receiver 27 or other receiving device from the VDG through a video port 25A on the VDG.

The system components identified in connection with FIG. 1 can all be implemented in a preferred platform by, for example, an IBM personal computer equipped with a transmission link and a video graphics card, such as those manufactured by Roctec. Other platforms, such as a cable converter box equipped with a microprocessor and memory, or a broadband network also could be used. Examples of the particular components are as follows: Microcontroller—Motorola part no. MC68331-16; ROM—Texas Instruments part no. TMS27PC512; DRAM—Texas Instruments part no. TM4256; EEPROM—Intel part no. 28F001BX-T. In any event, those of skill in the art will appreciate that the particular details of the hardware components and data storage are a function of the particular implementation of the system, and are not the subject of the present invention.

As discussed in detail below, the user may navigate through the program schedule system with a remote controller, such as that shown in FIG. 3, which operates on conventional principles of remote control transmitter-receiver logic, such as by infrared or other signalling, or other suitable user interface. The remote controller 31 communicates with the microcontroller 16 through the remote controller receiver 29, shown in FIG. 1, which can be a Silent Partner IR receiver and which receives signals transmitted by the remote controller 31 and supplies the microcontroller 16 with a corresponding digital signal indicating the key depressed by the user.

A remote controller suitable for the present invention, such as shown in FIG. 3, which can be a remote controller manufactured by Universal Electronics or Presentation Electronics' Silent Partner, may include a power switch 32, volume 33 and mute 34 controls, an ENTER key 35, 0-9 digit keys 36, four direction arrow keys 37A and 37B, a MODE key 38 and an information key 39 that is designated with a lower case "i." The power 32, volume 33 and mute 34 keys operate in the same manner as conventional remote controllers typically used with present-day television receivers. The numeric digit keys 36 also function in much the same manner as conventional remote controllers. A brief description of the remaining keys follows.

The MODE key 38 takes the user through various layers of the electronic program schedule system 10 and generally allows the user to return to a previous screen when he is in a submenu. The up/down direction arrow keys 37A allow a user to navigate through the different TV program channels when the program schedule system is in a FLIP or BROWSE mode, as will be fully described below, and also allow the user to navigate through highlighted-bars displayed on the TV screen when in a MENU mode. The left/right direction arrow keys 37B allow the user to navigate through selected time periods when the program schedule system is in the BROWSE mode, as will also be described below. They further allow the user to navigate across subject-matter categories while in the "Categories" submenu of the MENU mode, as well as to navigate across time periods when the program schedule system is in a pay-per-view ordering mode and, in general, navigate in left or right directions to select various icons and other objects. In addition, the up/down 37A and left/right 37B arrow keys may be utilized to control the scan feature of the present invention as more fully described below. The information, or "i," key 39 allows the user to view supplemental program and other information during the various modes of the program schedule system. The ENTER 35 key fulfills and inputs a command once the user has made a selection from the remote controller keys. The function and operation of these keys will be made more apparent in the detailed discussion of the FLIP, BROWSE and MENU modes below.

A second embodiment of the remote controller 40 is shown in FIG. 4. This embodiment of the remote controller also includes a power key 41, numeric digit keys 42, direction arrow keys 43A and 43B, information key 48, ENTER or SELECT or "OK" key 44, volume control 45, lockout key 45A, mute keys 46 and help key 49. It also includes pound sign and star keys.

This embodiment of the remote controller further includes a number of icon keys 47A and 47B, which correspond to different submenus or modes of the program schedule system. The icons 47A and 47B may also be displayed on the TV screen when the program schedule system is operating. The icon keys essentially replace the MODE key 38 used in the embodiment of the remote controller shown in FIG. 3. Using these keys, the user can move from one mode to another simply by depressing the icon key corresponding to the desired mode of operation of the program schedule system. In the embodiment of FIG. 4, the icons 47A and 47B are shown as graphic symbols situated directly above a corresponding color-coded key. Alternatively, the color-coded keys could be eliminated and keys could be formed in the image of the icon itself.

The embodiment of the remote controller shown in FIG. 4 also includes three color-coded viewer preference or favorite channel keys, 48A, 48B and 48C that are situated directly above the icon keys. Each of these keys indicates to the program schedule system a distinct user-created "Channel Preference" or "Favorite Channel" list, which is a listing of a specific subset of channels for a particular user, arranged in the sequential order that the user wishes to view during operation of the program schedule system. Thus, the system provides for at least three individual channel subsets for three individual users.

The remote controller of FIG. 4 also may be equipped with a "HELP" key 49, which, when depressed, causes the microcontroller 16 to retrieve previously stored instruction messages from memory and cause them to be displayed on the television receiver 27. These messages offer help to the user in the form of instructions that guide the user through the operation of the various operating modes of the electronic television program guide. They may be text messages, or instructional video images, or audio programs, depending on the storage capacity of the system, or any combination of these. Moreover, these help messages may be created so that they are context-sensitive, i.e., the messages displayed depend entirely upon the precise point in the operation of the electronic program guide that the user depresses the help key 48A. For example, information could be supplied for operation of the remote controller, for operating the FLIP or BROWSE mode (discussed below), or any other mode of operation of the guide, for impulse ordering, for setting, a lockout, etc. In order to accomplish this, each point of operation of the guide could be coded so that the microprocessor could track the current operating point, for example, by temporarily storing the code reflecting the present operating point as the user operated the guide. When the user pressed the help key 48A, the microcontroller 16 would retrieve an appropriate set of messages based on the presently stored operating point code. Additionally, the i key 39 could be used to carry out the function of the help key.

Finally, the remote controller of FIG. 4 may also be equipped with a SCAN key 50A and GO BACK or EXIT key 50B for use in connection with the scan feature of the present invention as more fully described below.

Additionally, each of the functions of the remote controllers can also be integrated into a keypad on the user's cable box or other hardware.

System Operation

In operation, the electronic program schedule system of the present invention functions as follows.

FLIP Mode

Figure 5A:
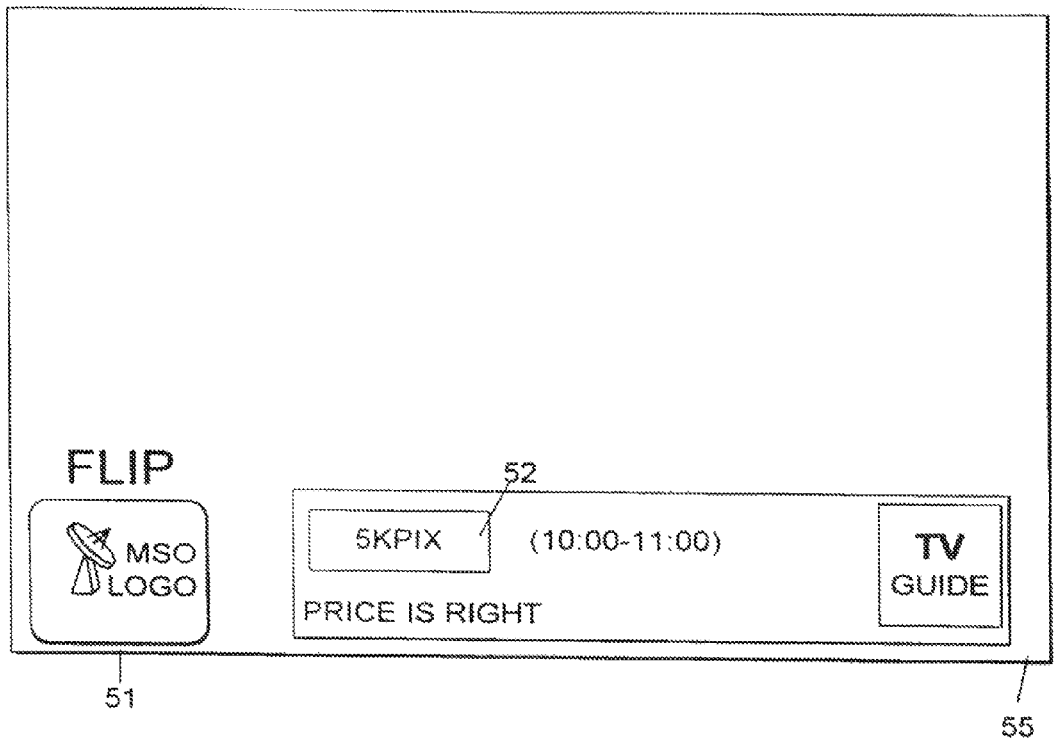
FIG. 5A shows an overlay appearing on a television screen in one mode of operation of the present invention.

When the user is viewing a particular program channel on the television receiver, the program schedule system defaults to a FLIP mode, shown in FIG. 5A. In this mode, a graphic overlay 51 containing programming information for the channel currently tuned on the tuner is superimposed in overlaying relationship with a received program signal 55 on the screen of the television receiver 27 whenever the viewer changes the program channel, for example, by using the up/down direction arrows on the remote controller. The video overlay device 25, such as shown in FIG. 1, combines the computer-generated RGB video-graphic overlay information with the NTSC-format program signal from the tuner 28, and supplies an NTSC-format output signal, which includes the program signal from the tuner and the program schedule overlay information for viewing on the television receiver 27.

The programming information contained in the graphic overlay 51 is supplied to the RGB video generator by the microcontroller. In FLIP mode, the microcontroller first searches the program schedule database in, for example, the DRAM 18 to retrieve the programming information for the currently tuned channel 52 corresponding to the current time; i.e., the time at which the user just turned on the television receiver for viewing. The microcontroller 16 then supplies the current channel and program information to the RGB video generator 24 which converts the digital data information to RGB format and supplies it to the video overlay device 25.

In normal operation, the microcontroller 16 defaults to displaying all channels offered by the cable company prioritized by numeric order, which is determined by the broadcast channel position in the radio spectrum or the marketing judgments of local cable operators. Using a favorite channel list or category criteria as discussed below, the user can revise the content and/or sequential order of the channels presented to the television receiver 27.

In general, if the user does not issue a change-channel instruction, or other command, from the remote controller 40 within a predetermined time interval while in the FLIP mode, the microcontroller 16 instructs the VDG 23 to remove the graphic overlay 51 from the television receiver, thus presenting only a program signal 55 to the television receiver 27 for viewing. The duration of the predetermined time interval is such that it allows the user sufficient time to read the programming information contained in the overlay. The duration of the predetermined time interval during which the graphic 51 overlay appears is stored in a location in non-volatile memory 20 addressable by the microcontroller 16. The user can change the duration of the time interval, by first entering a Viewer Preference mode; and then selecting an "overlay interval" entry. The microcontroller 16 then causes a user prompt to be displayed on the screen which, for example, asks the user to select an appropriate time period for displaying in the graphic overlay on the screen. Using the numeric keys, the user can input an appropriate response, for example, a period between 5 and 60 seconds, and then depress ENTER. The new interval period is then read and stored by the microcontroller 16 in the overlay time interval location in memory.

If the user issues a change-channel command from the remote controller 40 before or after the predetermined overlay period has elapsed, either by using the up/down direction arrows 43A, or by entering a desired channel number using the numeric keys 42 and then depressing the ENTER key 44, the microcontroller 16 will cause the tuner 28 to tune to the desired channel—either the channel immediately preceding or following the current channel when the up or down arrow 43A is used or the specific channel entered on the numeric key pad by the user—and will also search for and immediately cause to be displayed the current program information for that channel. Thus, as the user flips through the channels, the program schedule information for any selected channel automatically appears in the graphic overlay 51 while the actual program 55 appearing on the selected channel at the particular time occupies the remainder of the screen.

The system can also be configured to issue an error message, such as an audible beep or displayed text indicating an invalid key stroke, if the user depresses either the left or right direction arrow keys while in the FLIP mode.

In the FLIP mode, the scan feature may be activated by pressing a SCAN button 50A on the remote controller as shown in FIG. 4, by pressing and holding down one of the directional arrow keys (i.e. the up/down arrow keys designated 37A and 43A in FIGS. 3 and 4, respectively) for a predetermined user or system defined amount of time (e.g., 3 seconds), or by providing a SCAN icon button on the FLIP graphic overlay so that the user may navigate to the button and depress the ENTER or OK key on the remote controller (35 or 44 in FIGS. 3 *and* 4, respectively) to activate a scan. In the case where a directional arrow key is used, the user may control the scan to go forward (up arrow key) or backward (down arrow key) in the channel sequence. In the case where a scan button 50A is used on the remote control device or a scan icon button on a graphic display, the system will automatically begin a forward scan.

When the scan feature is activated while the system is in the FLIP mode, the data processor will cause the tuner to tune to the channel one higher (forward scan) or one lower (backward scan) than the currently tuned channel. In addition, the channel number from which the scan was initiated may be stored in the system's volatile memory (e.g., DRAM 18). This channel from which the scan was initiated is referred to hereinafter as the "start" channel. According to the ordinary operation of the FLIP mode, the program information will be displayed as if the user had simply changed the channel. After a preset period of time, the system will tune to the next highest (or lowest) channel and, again according to the ordinary operation of the FLIP mode, the corresponding program information will be displayed. After another period of time, the next highest (or lowest) channel in sequence will be tuned, and so on.

In a preferred embodiment, the system may be configured to automatically enter flip mode when a scan is initiated even if the user is watching television without the program guide activated. In this manner, program schedule information is automatically displayed to indicate the program currently airing on each channel as the program is displayed for the brief scan period. This is particularly useful in the situation where a commercial is being displayed while a channel is scanned, thereby preventing the user form identifying the program currently airing on that channel.

At such time as the present channel is the last available channel in the sequence, the next channel tuned during the operation of the scan function will be the first available channel in the sequence, just as an ordinary tuner "wraps around" to the lowest available channel in response to a channel up command from the highest available channel. For example, after reaching the highest available channel, the system will next scan to the lowest available channel, i.e., channel 2, or, on some systems, channel 1 or 0. Thereafter, the system will operate as described above, successively tuning for the predetermined time period, the next highest channel, until the scan is turned off by user action or a predetermined time out. Alternatively, the system may be configured to stop the scan when all available channels have been scanned and the start channel is tuned again.

If the user wishes to cause the tuner to stop the scan and remain tuned to the channel currently tuned during a scan, he may depress the SCAN key 50A again, or the OK or ENTER key 44, on the remote control device. The scan feature will then be deactivated and the user may proceed to view the selected program in the FLIP mode of operation.

An optional feature that may be provided in connection with the scan feature is the ability to immediately terminate a scan and return to the start channel. This may be implemented by designating a key on the remote control device that deactivates the scan and returns the system to the start channel in FLIP mode. For example a key 50B labelled "GO BACK" or "EXIT" may be provided on remote control device 40 shown in FIG. 4. Alternatively, an existing key on the remote control device may be utilized. For example, if a forward scan was initiated using, e.g., the up arrow key, the system may be configured so that depression of the down arrow key during a scan will terminate the scan and return the tuner to the start channel.

Figure 5B:
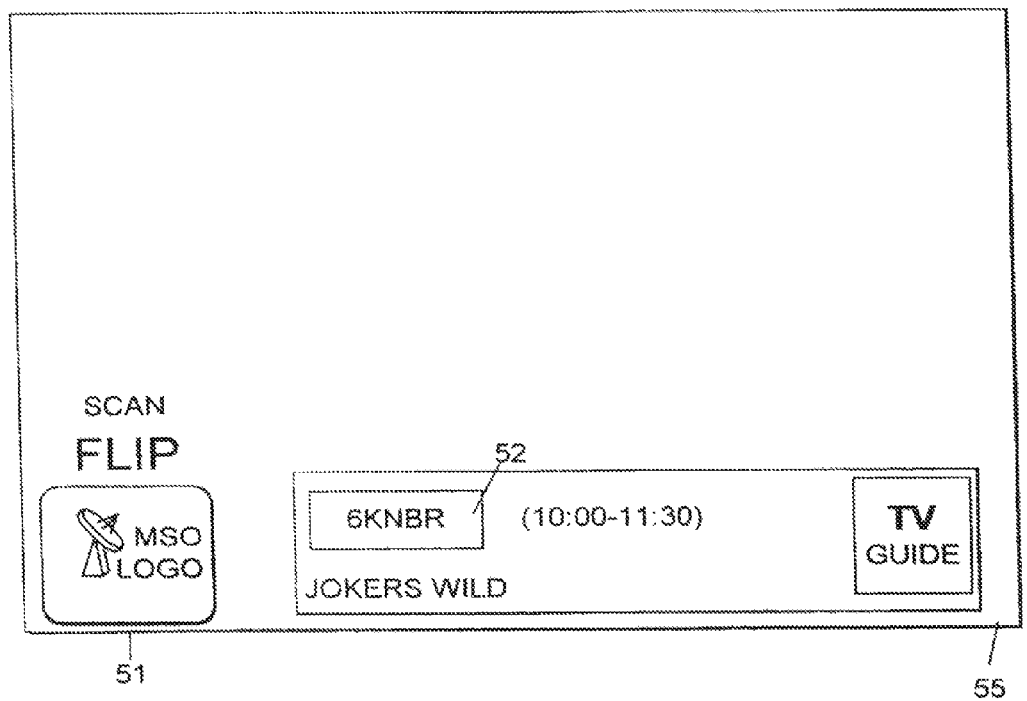
FIGS. 5B-C illustrate the operation of the scan feature in the "FLIP" mode of the present invention.
Figure 5C:
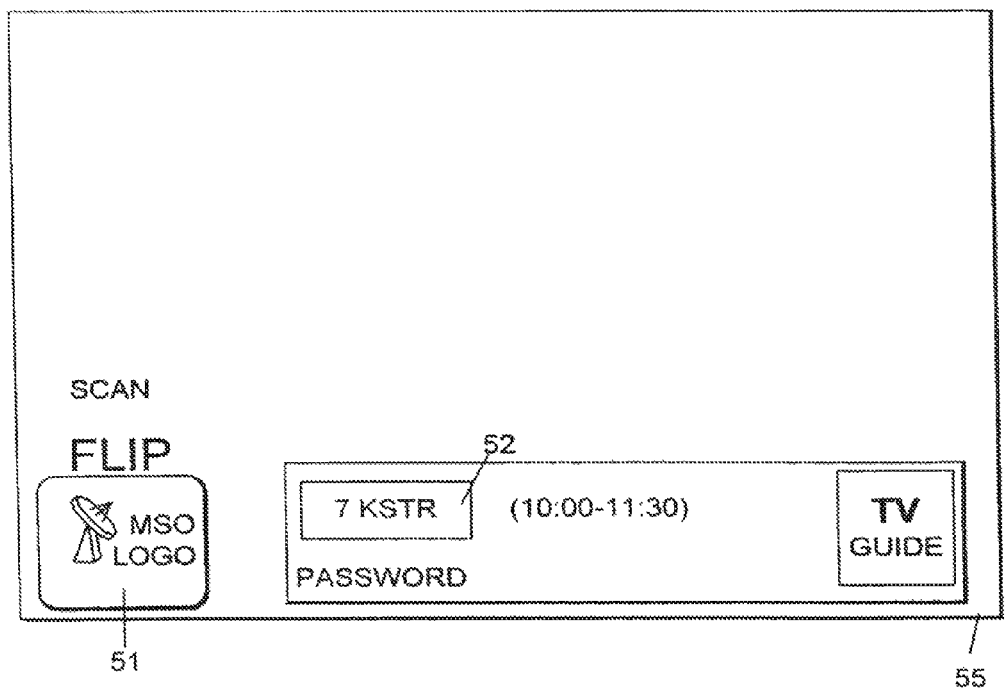

FIGS. 5B-5C illustrate the operation of a forward scan in FLIP mode, assuming the start channel is 5 as shown in FIG. 5A. As shown in FIGS. 5B-C, operation is identical to normal FLIP mode as if the user had depressed the channel up key two separate times. To the user, the only difference is that by depressing the SCAN key 50A a single time, or depressing and holding the channel up key a single time, the tuner automatically increments the channel by one after a predetermined amount of time. In addition, the word "Scan" may be displayed above the word "Flip" as shown in FIGS. 5B-C to alert the user that scan mode is activated.

The time period or term for which the tuner remains tuned to a particular channel during a scan Operation (hereinafter "term") may be fixed or user-definable. The term is stored in the system's non-volatile memory (e.g., DRAM 18). If the term is fixed, it should be sufficiently long to permit the user to evaluate the desirability of each channel's program and act accordingly, but sufficiently short to enable the user to cycle through all the available channels in a reasonable amount of time. As examples, terms of five or ten seconds may be chosen.

Figure 6:
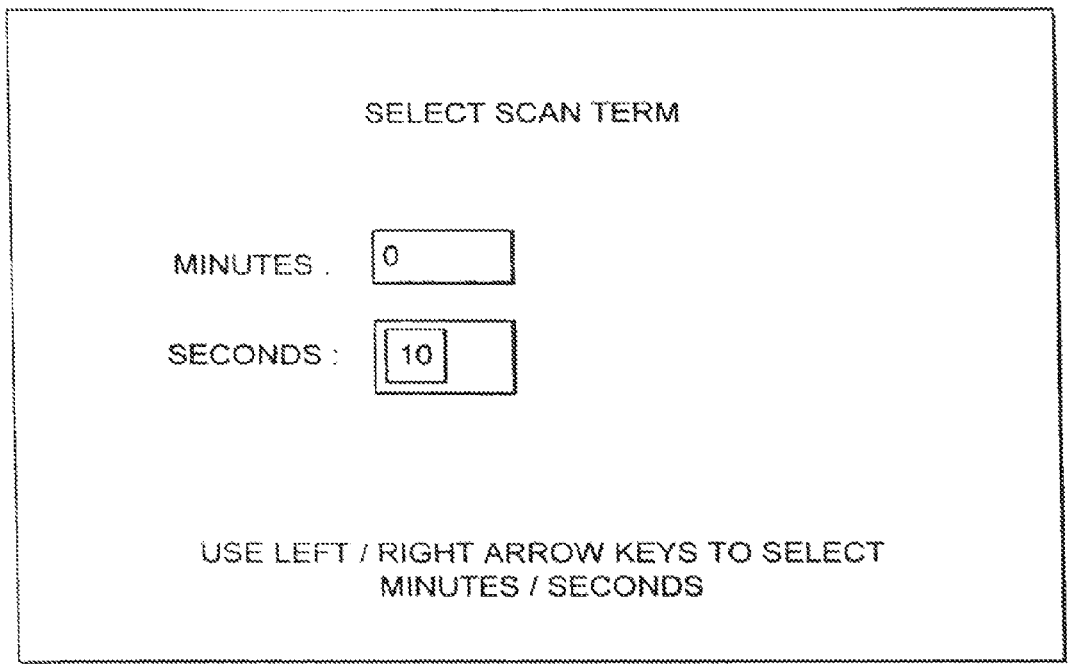
FIG. 6 illustrates a screen used in the present invention that permits a user to set the term of a scan operation.

If the system is configured to permit the user to choose the term, an appropriate default term is nevertheless selected. To change the scan term, a set-up menu (for example, by pressing the "MENU" key 47B on the remote controller 40) may be provided with a menu item labelled, for example, "Change Scan Term." Other appropriate labels may equally well be used. This selection causes the system to display the "Select Scan Term" screen shown in FIG. 6. As shown in FIG. 6, the legend "Select Scan Term" appears at the top of the screen and the legend. "Use Left/Right Arrow Keys to Select Minutes/Seconds" appears below the user input fields.

When the screen is first displayed, the number of minutes and seconds of the current term is displayed in the fields adjacent to the labels "Minutes" and "Seconds", respectively. The number of seconds is highlighted, indicating that the value of that field may be changed. The user may enter a desired number of seconds using the number keys 42 on the remote controller, or the user may increase or decrease the term in one-second increments by pressing the up/down keys 42A on the remote controller. Pressing either the right or left arrow keys 43B on the remote controller while the seconds field is highlighted will cause the minutes field to be highlighted for editing.

When the minutes field is highlighted, the number of minutes of the term is displayed. The user may enter a desired number of minutes using the number keys on the remote controller, or the user may increase or decrease the term in one-minute increments by pressing the up/down keys 42A on the remote controller, respectively. Pressing either the right or left arrow keys 43B on the remote controller while the minutes field is highlighted will cause the seconds field to be highlighted for editing.

When the user is satisfied that the seconds and minutes fields reflect the desired term, the OK or ENTER button 44 on the remote controller is pressed, and the term is updated in the system's non-volatile memory. Thereafter, the new term will be used when the scan feature is activated.

BROWSE Mode

To initiate the BROWSE mode, the user depresses the MODE switch once while in the FLIP mode when using the first embodiment of the remote controller 31 shown in FIG. 3. Utilizing the second embodiment of the remote controller 40 shown in FIG. 4, the user would depress the button below the BROWSE icon 47A.

Figure 7:
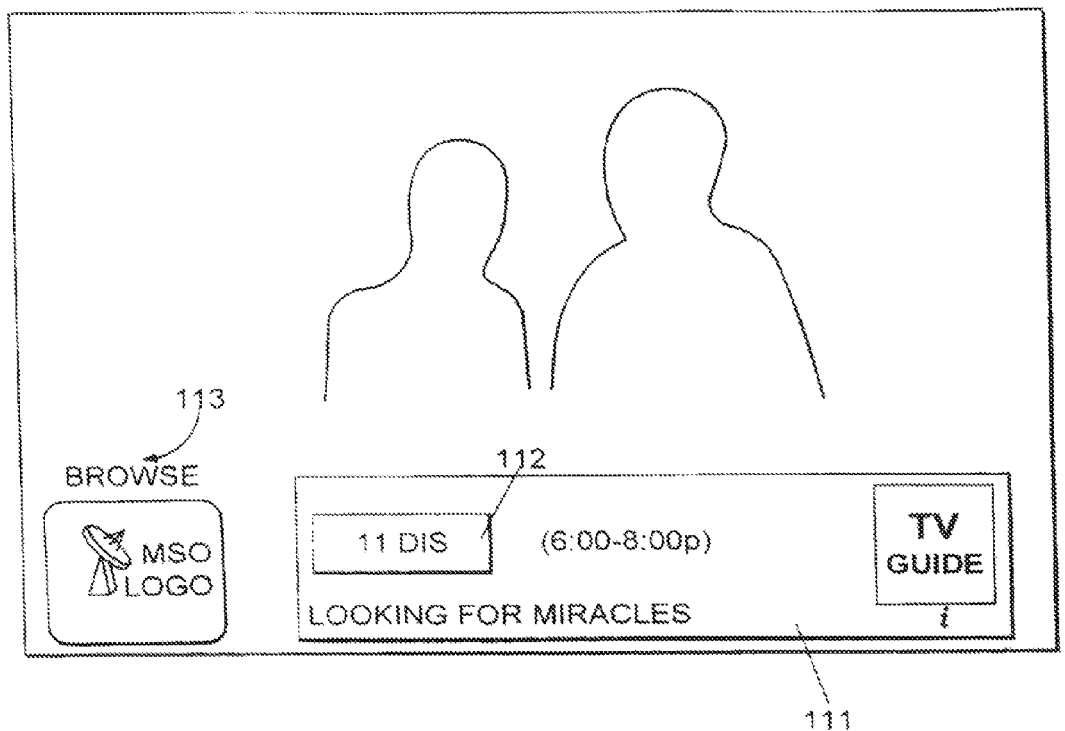
FIG. 7 shows a graphic overlay appearing on a television screen in a "BROWSE" mode of operation of the present invention.

In the BROWSE mode, the user is provided with the ability to browse through program schedule information for any channel, including, but not limited to, the channel being viewed, while at the same time continuing to view the TV program previously selected. As shown in FIG. 7, in this mode the graphic overlay information that appears in the FLIP mode is replaced with programming information for the channel being browsed, which may or may not be the channel currently being viewed by the user. After the user issues the command from the remote controller 40 to enter the BROWSE mode, a graphic overlay 111 is generated, as in the FLIP mode, with program schedule information for the currently tuned channel 112 and a textual BROWSE indicator 113 to remind the user of the currently active mode, as shown in FIG. 7.

Figure 8:
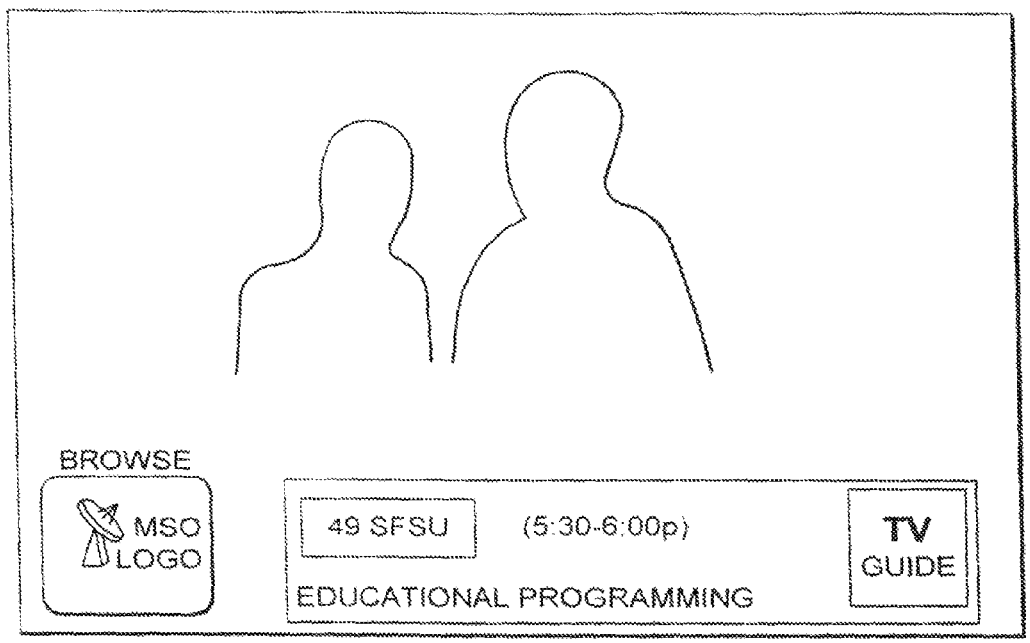
FIG. 8 shows a graphic overlay appearing on a television screen in a BROWSE mode of operation of the present invention having different information from that shown in FIG. 7.

If the user depresses either the up or down direction arrow on the remote controller 40 while in the BROWSE mode, program schedule information for either the prior or next channel is displayed in the graphic overlay portion 111 of the television receiver screen 27, while the tuner remains tuned to the channel program that appeared on the television receiver at the time the user entered the BROWSE mode, as shown in FIG. 8, and continues to so appear. Each successive depression of the up or down direction arrow key produces corresponding program schedule information for the selected channel. The graphic overlay may also include a small video window for showing the actual video signal of a currently aired program or a clip of a future program corresponding to the schedule information then appearing in the BROWSE overlay. In this way, the user can simultaneously browse program schedule information for all channels while continuously viewing at least one selected program on the television receiver. With the advent of sophisticated television receivers, it may also be possible to simultaneously display multiple broadcast programs on a single screen for viewing, or to split the screen to show, for example, broadcast programs in combination with advertisements. The BROWSE feature could be used in any of these situations.

If, at any time during browsing of the program schedule information in the BROWSE mode, the user desires to tune the television receiver 27 from the program channel currently being viewed to the program channel indicated in the schedule information in the graphic overlay, he simply depresses the ENTER button 44 and the tuner 28 will be tuned to that channel. If the user does not want to view another channel and wishes to exit the BROWSE mode, thus removing the graphic overlay 111 with the program schedule information, he must depress the MODE key twice in the first embodiment of the remote controller 31. The first depression of the MODE key takes the user to the MENU mode, discussed below, and the second depression will take the user to the FLIP mode. Once in the FLIP mode, the graphic overlay will be removed after the duration of the time-out interval has passed. In the second embodiment of the remote controller shown in FIG. 4, the user toggles the BROWSE icon key to deactivate the BROWSE mode.

When the user first enters the BROWSE mode and begins browsing channels, the schedule information appearing in the overlay portion 111 describes the programs currently playing on any particular channel. In order to view programming information for later or earlier times, the user employs the left and right direction arrows 43B. As a consequence, the system will display future program schedule information for the particular channel previously selected by the up and down direction arrows, whether it is the channel currently being viewed or any other available channel. The schedule information presented includes the name of the program and program start/stop time. The instant embodiment of the system, in order to conserve memory, will not allow the user to view programming information for a time prior to the current time. The system could be easily modified to provide such information if adequate memory is made available. It may be desirable, for example, to allow a user to view schedule information for an earlier time to find a particular show and then allow the user to command the microcontroller to find and display future airing dates of the show, or the microcontroller could simply do this automatically.

Figure 8A:
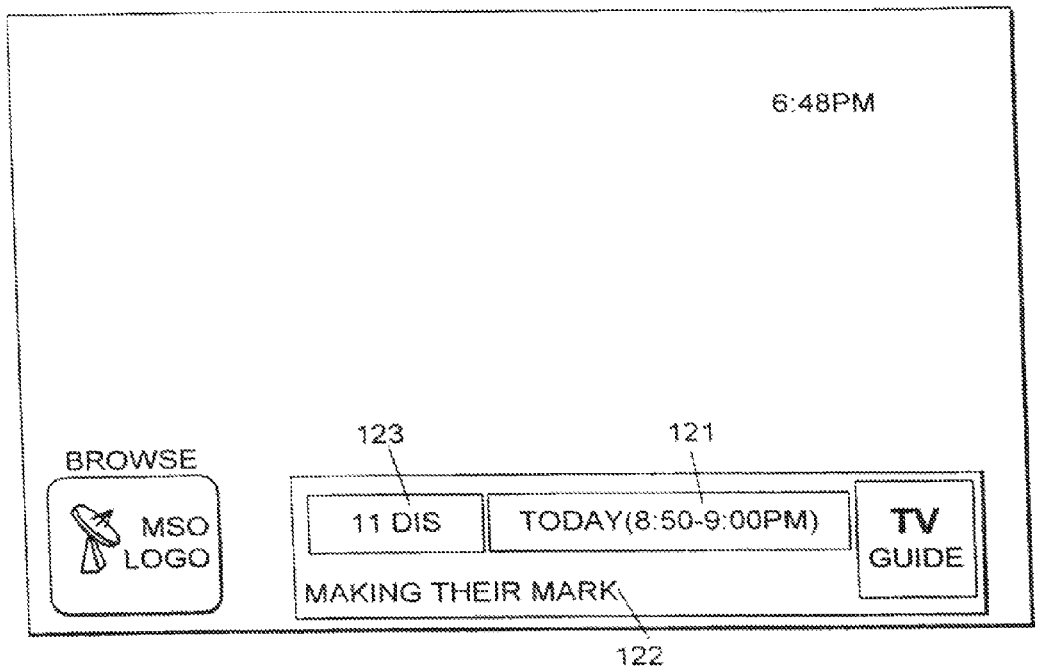
FIG. 8A shows a graphic overlay appearing on a television screen in a BROWSE mode of operation in the present invention displaying schedule information for a time and channel other than that shown in FIG. 7.

When viewing program schedule information for a future time in the BROWSE mode, the displayed time of airing 121 of the particular show 122 is highlighted, as well as the channel number and service indicator 123, as shown in FIG. 8A. Such highlighted information reminds the user that he is viewing program schedule information for a future time. Also, when viewing program schedule information for a future time on any particular channel in the BROWSE mode, depression of the channel up direction arrow key on the remote controller 40 causes programming schedule information for the next channel to appear, which corresponds in time to the future time that was being viewed before the up key was depressed by the user. The channel down direction arrow key 43B functions identically in this mode.

Figure 9A:
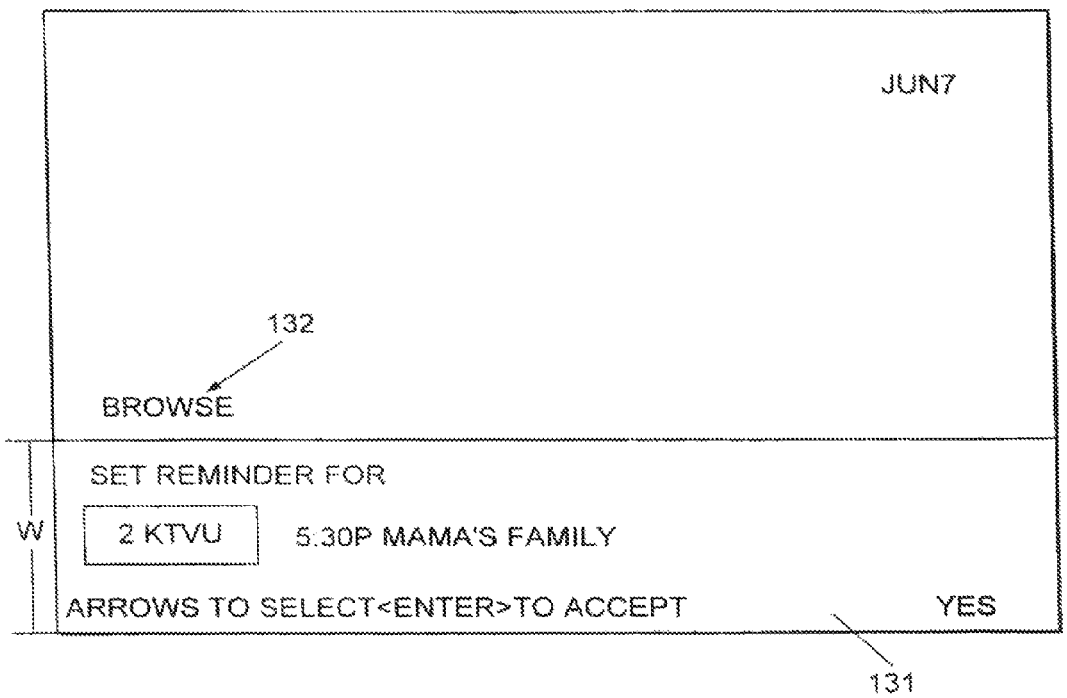
FIG. 9A shows a graphic overlay appearing on a television screen in a BROWSE mode of operation in the present invention to permit a user to set a REMINDER message for a future program.
Figure 9B:
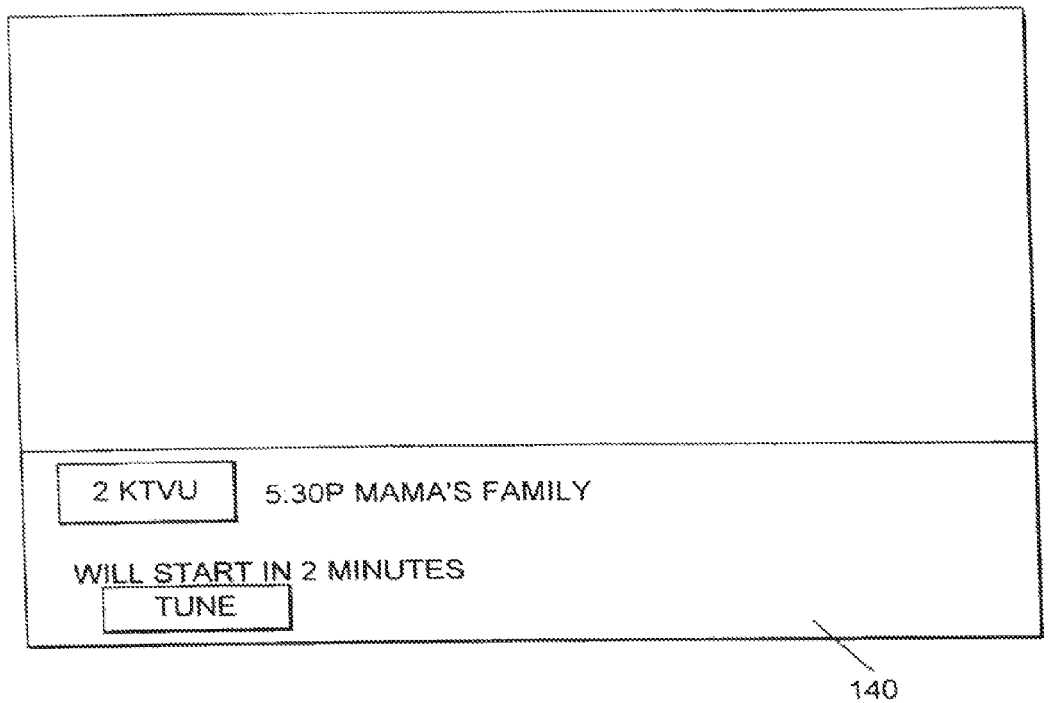
FIG. 9B shows yet another graphic overlay appearing in a REMINDER mode of operation of one embodiment of the present invention.

If while viewing program schedule information for a future time in BROWSE mode the user depresses the ENTER key on the remote controller, the microcontroller 16 will instruct the VDG 23 to display a REMINDER overlay message 130 which, as shown in FIG. 9A, is displayed as a second overlay 131 appearing above the BROWSE overlay 132. The REMINDER message 130 queries the user as to whether the system should remind the user, at a predetermined time before the start of the selected program, that he or she would like to view the selected program, as shown in FIG. 9A. If the user responds affirmatively, the microcontroller 16 stores reminder data consisting of at least the channel, time and day of the selected program in a reminder buffer, which contains similar schedule information for all programs for which the user has set a reminder. At a pre-determined time before the selected program start time, for example, five minutes, the microcontroller 16 will retrieve schedule information, including title and service, based on the reminder data, and will instruct the VDG 23. to display a REMINDER overlay message 140 on the television receiver 27, as shown in FIG. 9B, to remind the user that he or she previously set a reminder to watch the selected program. The REMINDER message 140 contains the channel; service and start time. It also displays the number of minutes before the time of airing of the particular show and updates the display every minute until the time of airing. The REMINDER message 140 also displays a "TUNE" inquiry, which asks the user if she would like to tune to the selected program. When the user sets multiple reminders, the reminder overlays are stacked, for example, in ascending order according to the time each reminder is scheduled to be displayed, and the next reminder message will appear on the television receiver after the user takes appropriate action to remove the reminder message then being displayed. The REMINDER message (140) could also be adapted to allow the user to display or modify a list of all reminders previously set by the user. As with the overlay display time period in the FLIP mode, the user can modify the time period before a selected program that the REMINDER message appears by entering the Viewer Preference mode and revising the time entry.

When the user selects a future program, he may also be queried whether to set a VCR timer for programmed recording. When a user presses the ENTER button 44 on the remote control device while a future program is selected, the user may also be queried whether the system should set a VCR timer to control a VCR to turn on at the scheduled start time of the program and turn off at the scheduled off time. A REMINDER message may then be displayed, e.g., two minutes before recording is to begin to query the user whether to cancel the recording of the program.

The scan feature of the present invention may also be used with the BROWSE mode of an EPG. If the scan feature is activated while the EPG is in BROWSE mode, by, e.g., pressing and holding an up/down key 43A or left/right key 43B, the particular key chosen will determine whether the scan is by time or by channel and the direction of the scan. For example, the up arrow key will initiate a forward channel scan, the down arrow key a backward channel scan, the right key a forward time scan, and the left key a backward time scan (if past program schedule information is kept in memory). Alternatively, if the scan is initiated using the SCAN button 50A on the remote control device, the user can be queried whether the scan should proceed channel-wise or time-wise and depresses a designated key to choose one or the other. For example, as shown in FIG. 10, the user presses the "1" number key on the remote controller to proceed channel-wise or presses the "2" number key on the remote controller to proceed time-wise. Alternatively, the system may be configured to begin the scan in the direction of the most recent directional arrow key pressed by the user.

Figure 11A:
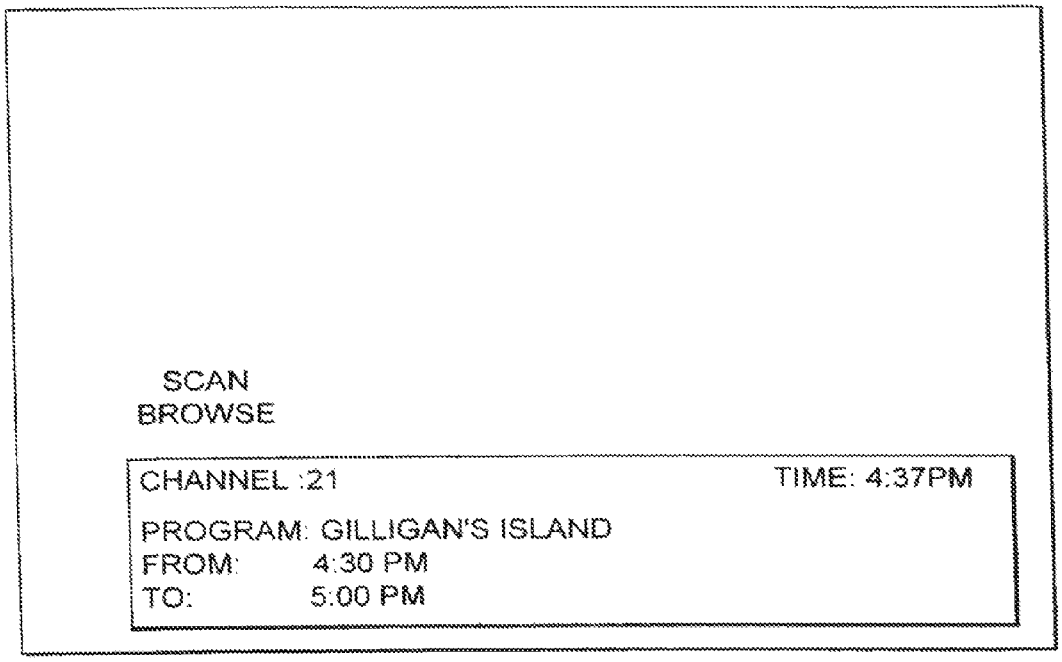
FIG. 11A-C show three successive screen displays of a channel-wise scan in the BROWSE mode of operation of one embodiment of the present invention.
Figure 11B:
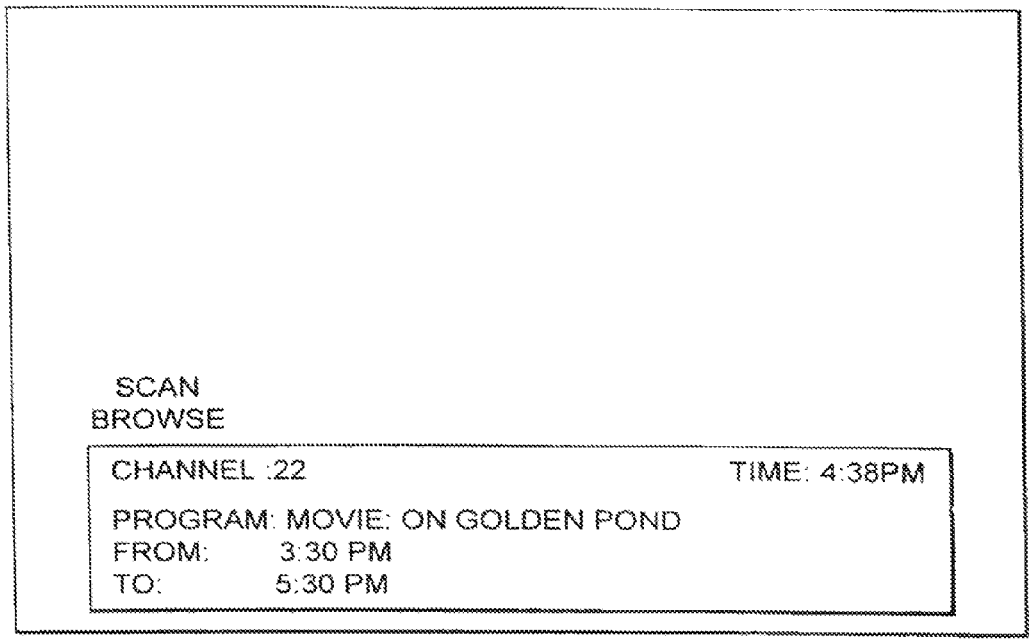
Figure 11C:
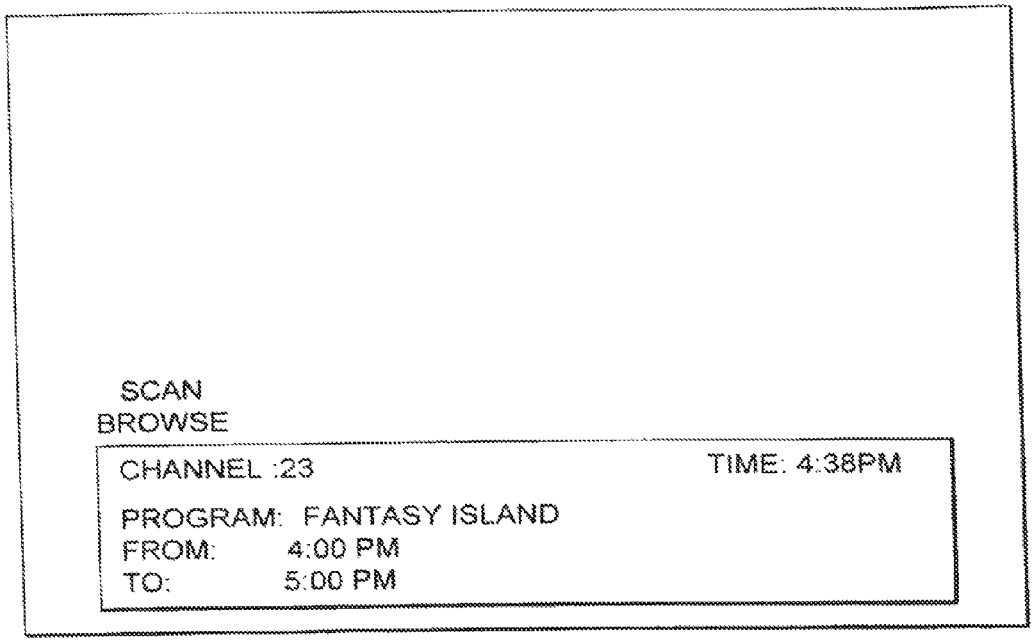

The BROWSE mode channel-wise scan feature begins by displaying the program information for the currently viewed television channel or, optionally, for the then-current program on the next channel in the sequence. After the term has elapsed, the program information for the current program on the next television channel is likewise displayed, and so on. Three successive screen displays for a channel-wise scan are shown in FIGS. 11A, 11B, and 11C. As illustrated in those figures, the textual messages "BROWSE" and "SCAN" may be included to indicate the current operational mode of the EPG to the user.

As in the FLIP mode scan, at such time as the program information is being displayed for the last available channel in the sequence, the system wraps around to the first available channel in the sequence. Thereafter, the system will operate as described above, successively displaying, for the term, program information for the next channel in the sequence.

A BROWSE mode channel-wise scan for the current time period may be terminated in several ways. Also as in the flip mode, during a channel-wise BROWSE-mode scan, the user may press the ENTER or OK key 44 to terminate the scan at a desired channel. This will cause the tuner to tune to the desired channel. Alternatively, the user may depress the GO BACK or EXIT key 50B to terminate the scan and return to the BROWSE mode of the EPG with the start channel information displayed, i.e., the program schedule information that was displayed when the user initiated the BROWSE scan. As a third option, if a SCAN key 50A is provided on the remote control device, the user may depress this key to simply terminate the scan and return to normal BROWSE mode using the currently displayed program schedule information.

Alternatively, if the BROWSE channel-wise scan is scanning, program schedule information for a future time period, upon depression of the ENTER or OK key 44, the user may be queried whether he wishes to set a REMINDER message for the program or set a VCR timer to control a VCR to record the program at its scheduled time. As for a BROWSE channel-wise scan, depressing the GO BACK or EXIT key 50B will terminate the scan and return the user to the BROWSE mode of the EPG with the start channel information displayed, i.e., the program schedule information that was displayed when the user initiated the BROWSE scan. Again as for a BROWSE channel-wise scan, if a SCAN key 50A is provided on the remote control device, the user may depress this key to simply terminate the scan and return to normal BROWSE mode using the currently displayed program schedule information.

For either a BROWSE channel-wise or time-wise scan, the system may be configured to automatically terminate the scan and return to a display of program schedule information for the start channel once program schedule information for each available channel has been displayed.

A BROWSE mode time-wise scan begins by displaying the program information for the currently viewed program or, optionally, for the program next to air on the currently viewed channel. Alternatively, if past listings are stored in memory, a backward time-wise scan may be initiated. A time-wise scan is instituted while displaying program schedule information for a particular channel and time. After the term has elapsed, the information for the next (or previous) program on the same channel is displayed, and so on.

As compared with a FLIP mode or BROWSE mode channel-wise scan, a BROWSE mode time-wise scan requires the establishment of an additional parameter. Either as a default or as defined by the user, in a time-wise scan it is necessary to define the outer limit of the time window for which information is displayed during the scan. The limit may simply be co-extensive with the storage capacity of the system. Alternatively, a different default value may be used, such as the end of the calendar day or a window extending 24 hours into the future. In a forward time-wise scan, once the scan reaches the end of the time window, the system will wrap around to the current time. Alternatively, if past listings are stored, the system could be configured to wrap around to the earliest stored listing for the given channel. Rather than wrapping around, the system may also be configured to terminate the scan automatically when the last program in the time window is reached. As another option, a set-up screen may be provided where the user can select the time window. Finally, as yet another option, rather than defining a time window, the window may be defined based on the number of programs so that, e.g., the system will scan ahead to the next 10 programs scheduled for the channel and then wrap around to the program scheduled for the current time. Similarly, the user set-up screen may also be configured to permit the user to define the window based on number of programs.

Figure 12A:
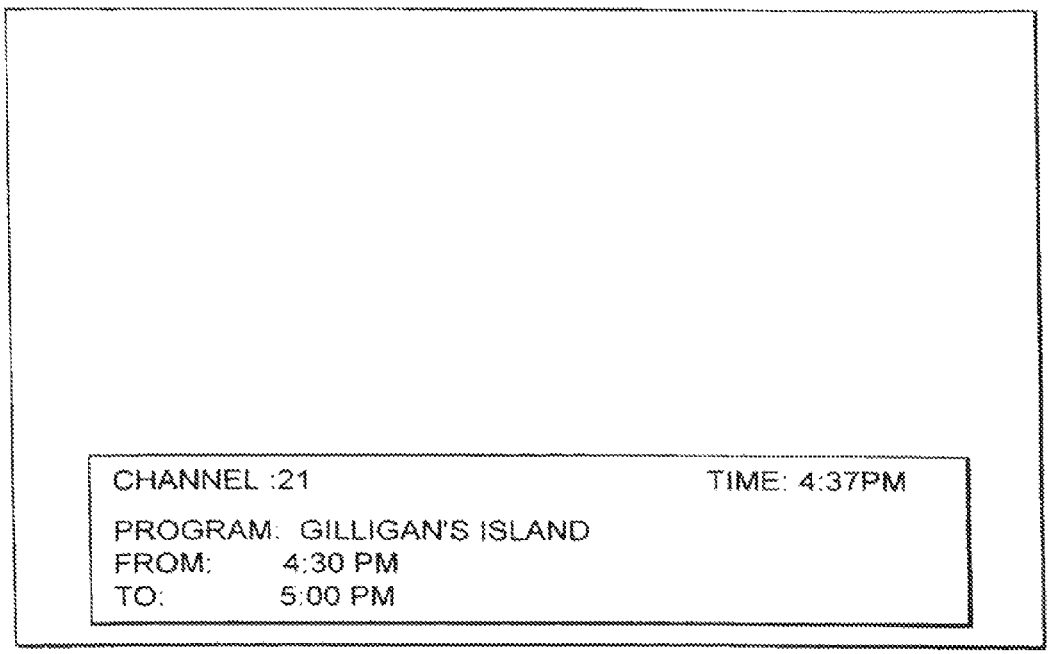
FIGS. 12A-12C show three successive screen displays of a time-wise scan in the BROWSE mode of operation of one embodiment of the present invention.
Figure 12B:
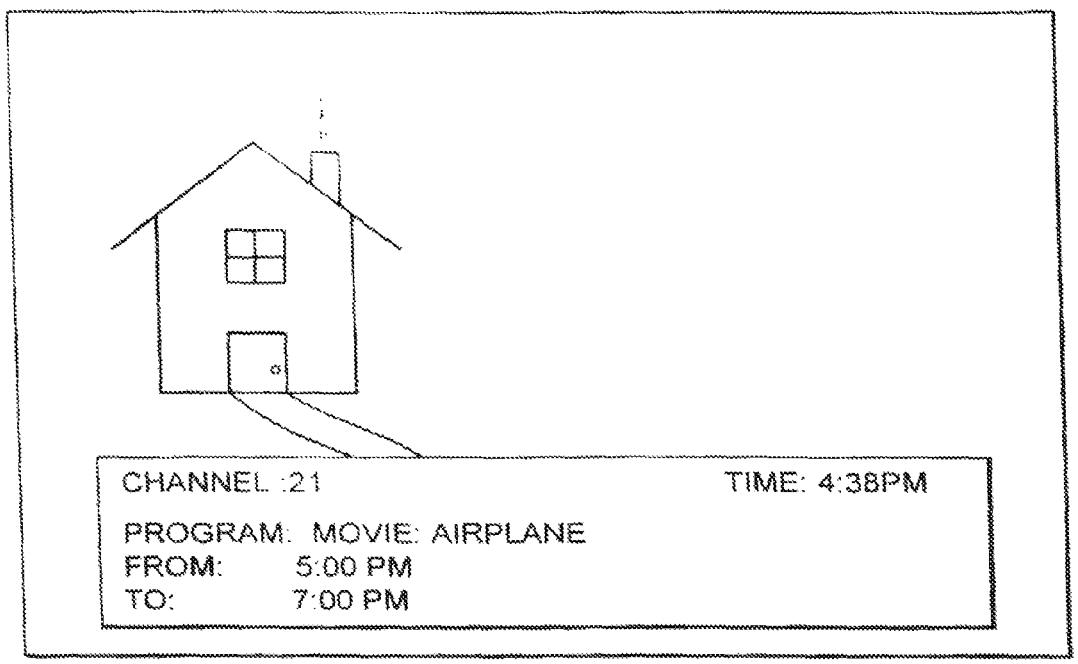
Figure 12C:
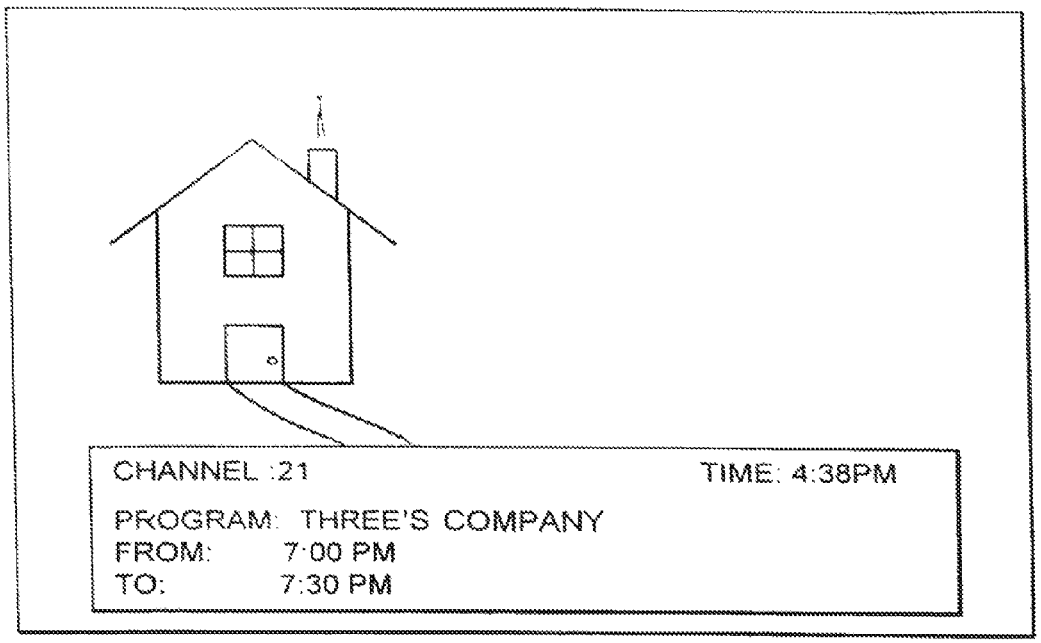

Three successive screen displays for a time-wise BROWSE scan are shown in FIGS. 12A, 12B, and 12C.

Figure 13A:
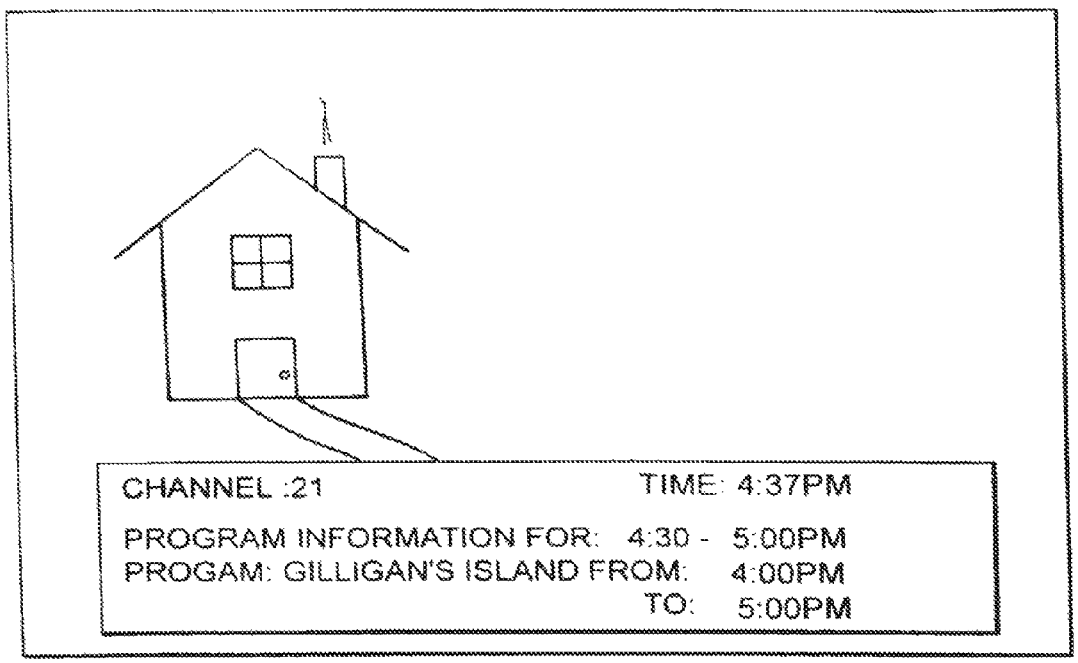
FIGS. 13A-13C show three successive screen displays of an alternate embodiment of a time-wise scan in the BROWSE mode of operation of one embodiment of the present invention.
Figure 13B:
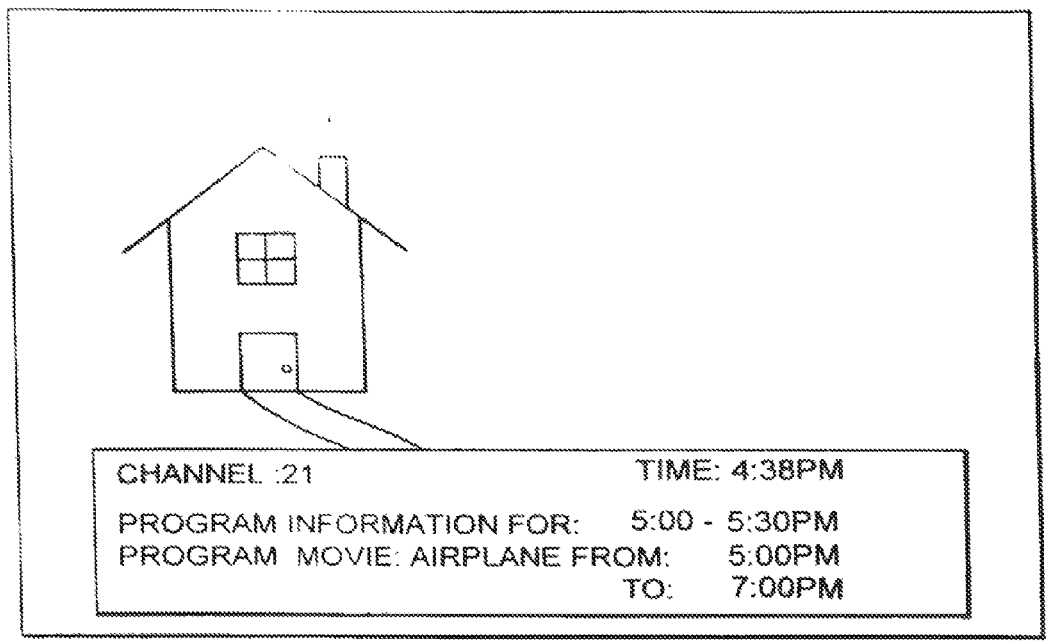
Figure 13C:
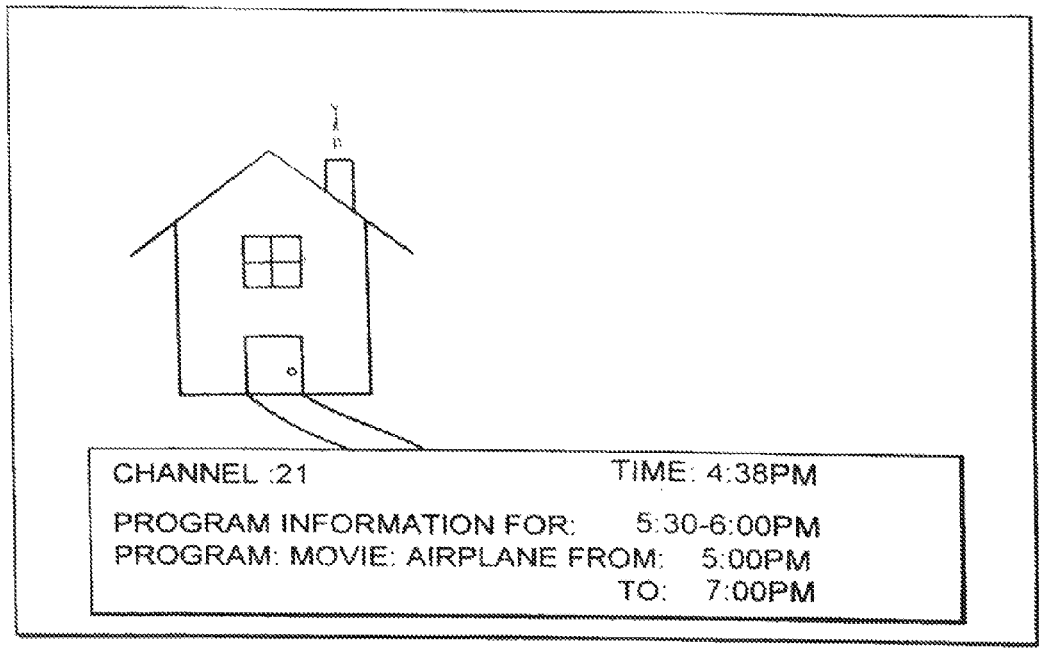

Alternatively, rather than a program-by-program display, the successive program information displays can be for programs airing on the currently viewed channel at each hour and half-hour interval, whether or not a new program begins at that time. Three successive screen displays for this kind of time-wise scan are shown in FIGS. 13A, 13B, and 13C. As shown in FIGS. 13A, 13B, and 13C, the information presented for the future programs includes an identification of the half-hour segment for which information is presented, the title of the program, the program's start time, and the program's end time.

In BROWSE mode, when a time-wise scan is performed and the user presses the ENTER or OK key 44 while program schedule information for a future program is displayed, the system may be configured to query the user whether he wishes to set a REMINDER message for the program or set a VCR timer to control a VCR to record the program at the scheduled time as discussed above.

In a preferred embodiment, as the system is performing a browse scan, the program schedule information for the presently displayed listing is completely removed from the display before program schedule information for the next sequential listing is displayed. In addition, as for manual browse, during a browse scan, rather than (or in addition to) displaying textual information for programs other than the currently-tuned program, the system may be configured to display the video signal for currently airing programs for a current time channel-wise scan, or video clips for future programs for a future time channel-wise scan or a time-wise scan. In an alternate embodiment, the system may be configured to display program schedule information for multiple channels (during a channel-wise scan) or multiple time periods (during a time-wise scan).

Figure 14:
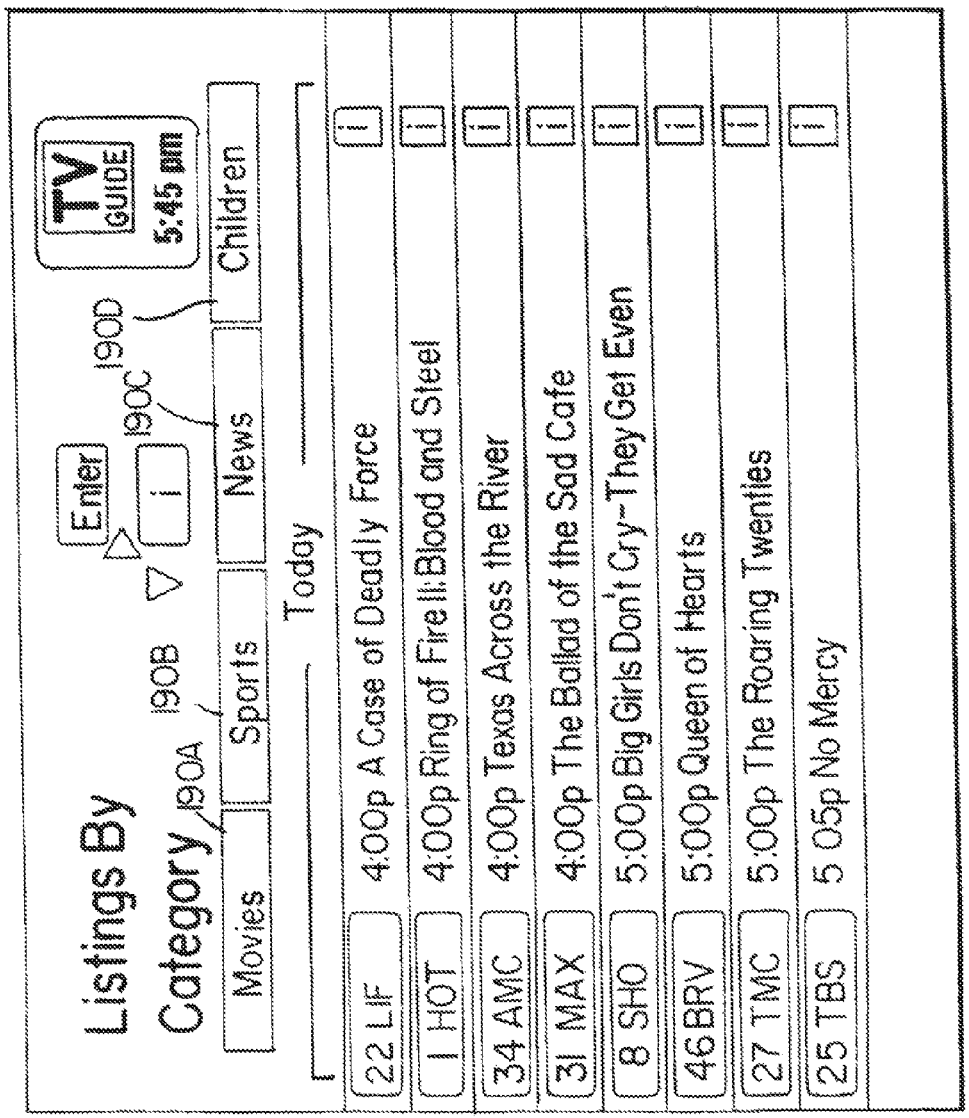
FIG. 14 shows schedule information displayed in a Listings By Category mode of operation of one embodiment of the present invention.

FIG. 14 illustrates a "Category Listing" mode in which program schedule information is displayed and categorized by program content. The particular listing shown in FIG. 14 includes the categories of Movies, Sports, News and Children 190A-190D. The database record stored for each listing contains a content-specific identifier so the microcontroller can search the database and categorize the information by content for purposes of displaying it in the Category Listing mode. As shown in FIG. 14, the user can manipulate the cursor left or right to highlight any one of the categories which appear at the head of the listing. In FIG. 14, the "Movies" category 190A is selected. As shown, the user is given a display of all movies, prioritized by time and then alphabetically by title of show, beginning with the half-hour immediately preceding the current time unless the current time is on the hour or half-hour, in which case the display begins with the particular hour or half-hour. The screen display shown in FIG. 14 also includes a textual description of the current operating mode of the program schedule system.

If the user highlights a show which is currently airing, he can immediately tune to that show by depressing the ENTER key on the remote controller 40. If the highlighted show is one that will appear at future time, the user is again given the option of setting a REMINDER message or a VCR timer.

The scan feature may also be utilized in conjunction with subsets of the available channels. For example, it will be apparent to those of ordinary skill in the art that the scan feature may be used in conjunction with the Listings by Category mode of an EPG so that, e.g., if the user is in FLIP mode but viewing only sports programs, when a scan is initiated, only those channels currently displaying sports programs are tuned during the scan. The same is true for a channel-wise scan in BROWSE mode—the set of channels included in a BROWSE channel-wise scan may be limited to channels for which programs in a particular category are scheduled to appear, whether the system is scanning through programs scheduled to appear during the current time period or a future time period.

In addition, in a time-wise browse scan, the system of the present invention may be configured to permit the user to select certain time periods in the time window for which schedule information is displayed. For example, if the system stores three days of program schedule information, and the time window for a BROWSE time-wise scan is set to be co-extensive with the storage capacity of the system, the user may be provided with a set-up screen to control a time-wise BROWSE scan to skip certain time periods and display only program schedule information for, e.g., prime time (8:00-11:00 pm), but not other time periods.

Similarly, the user may activate a favorite channel list to control a scan in FLIP mode or a channel-wise BROWSE scan. The use of favorite channel lists to restrict the channels in a channel tuning sequence is known in the art. Thus, in FLIP mode, only channels on the selected favorite channel list are tuned for the scan and in BROWSE mode, only program schedule information for channels on the user's favorite channel list is displayed.

Figure 15:
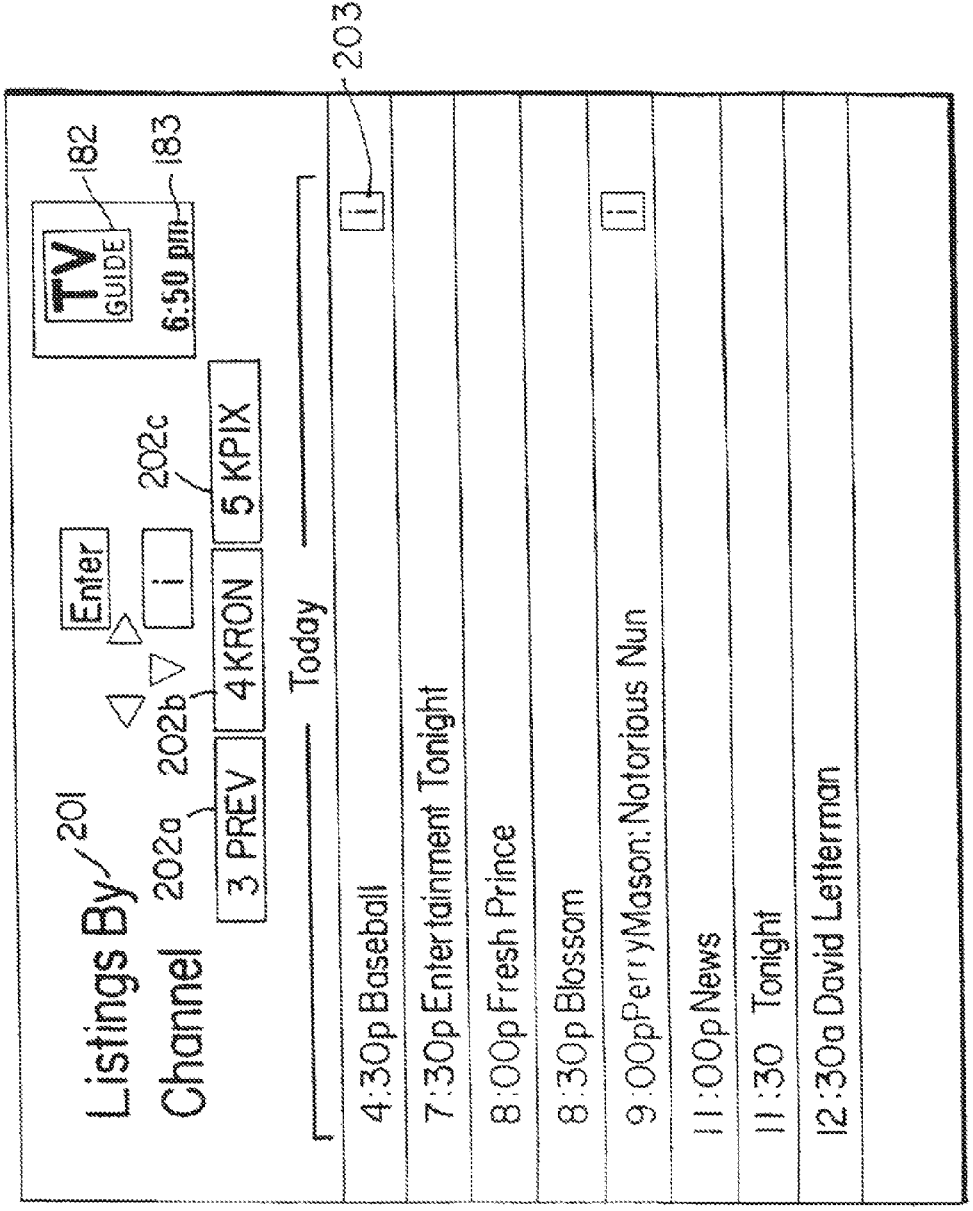
FIG. 15 shows schedule information displayed in a Listings By Channel mode of operation of one embodiment of the present invention.

FIG. 15 illustrates a "Channel Listing" mode in which the program schedule information is categorized and displayed by channel. The screen display shown in FIG. 15 includes a textual mode identifier 201 and the window including the logo icon 182 and alternating time/date display 183. At the head of the program listing is a list of several consecutive channels 202A-202C beginning with the last channel viewed by the user before entering the Channel Listing mode. The channel in the middle window 202B is highlighted and is the channel for which schedule information is displayed. The display identifies those programs appearing on the highlighted channel beginning with the half-hour immediately preceding the current time unless the current time is on the hour or half-hour, in which case the display begins with the particular hour or half-hour. The user can display further future listings by manipulating the cursor to the bottom of the screen and paging the display, as previously described. The user can also change the selected channel by manipulating the left or right direction arrow keys on the remote controller 40. When the user issues a change-channel command in this manner, the next consecutive channel will be displayed in the highlighted window 202B in the channel string at the head of the display, and schedule information for the newly selected channel will be displayed on the television receiver 27.

As with other modes, if a user wishes to tune to a highlighted program that is currently airing, he can do so by simply depressing the ENTER key on the remote controller 40, and if the user wishes to view or record a program that airs at a future time, the user is again given the option of setting a REMINDER message or a VCR timer.

The scan feature may also be implemented in connection with modes of the guide other than FLIP and BROWSE that utilize full screen displays of program schedule information. For example, in the Channel Listings mode, a scan can be initiated so that the system automatically pages through multiple screens of listings as shown in FIG. 15—each screen for a different time period and the same channel—displaying each page for a predetermined term. Similarly, in the By Time mode of an EPG where program schedule information for a plurality of channels and a single time period is displayed, the scan feature may be used to scan through the different channels. Scans may be initiated in the same manner as described above—by pressing and holding an up/down arrow key 43A or by pressing the SCAN key 50A. A scan in either of these modes may be terminated by pressing the ENTER or OK key 44 or SCAN key 50A to stop the scan so as to permit the user to select a program for viewing (or set a REMINDER message or VCR timer) from the currently displayed page of program schedule information.

Additionally, the electronic program guide could be configured to store a unique digital identifier for each program along with its schedule information and later use the identifier—e.g., by transmitting it—to indicate to a recording or storage device, such as a video recorder, that the user wishes to record the program. The program guide could also use the identifier to automatically control operation of the video recorder. The electronic program guide could also be configured to use other stored schedule information for this purpose.

The form and content of a particular computer program to implement the invention disclosed herein will be readily apparent to those skilled in the art of video system programming and graphic display. It will also be appreciated by those skilled in the art that there can be departure from the specific embodiment of the invention described herein without departing from the true scope of the claims appended hereto.

What is claimed is:

1. A method for generating for display program listings using an interactive program guide, comprising:
   receiving a first user selection
   in response to receiving the first user selection:
      determining a scan mode and scan direction based on the first user selection wherein the scan mode is a channel-wise scan or a time-wise scan;
      automatically scanning a sequence of the program listings; and
      generating a display of a first stationary program listing simultaneously with a first video corresponding to the first stationary program listing for a first period of time, and
      generating a display of a second stationary program listing simultaneously with a second video corresponding to the second stationary program listing for a second period of time.

2. The method defined in claim 1, wherein the first user selection generates a start scan command and wherein the automatically scanning a sequence is initiated in response to the start scan command.

3. The method defined in claim 1, wherein a user input generates a stop scan command and wherein the automatically scanning a sequence is terminated in response to the stop scan command.

4. The method defined in claim 1, wherein the first and second periods of time that the first and second stationary program listings are generated for display are user definable.

5. The method defined in claim 1, wherein the program listings generated for display are for programs scheduled to appear on a plurality of television channels.

6. The method defined in claim 5, wherein the program listings generated for display are for programs scheduled to appear during a common time period.

7. The method defined in claim 5 wherein the plurality of television channels comprises a sequence of consecutively numbered channels.

8. The method defined in claim 5, further comprising receiving a second user selection of a desired program in the sequence of program listings, wherein the desired program is generated for display in response to the second user selection.

9. The method defined in claim 1, wherein the first user selection is received while generating a display of a program on a given channel and wherein the sequence of program listings contains programs scheduled to appear on the given channel.

10. The method defined in claim 9, wherein the sequence of program listings contains programs scheduled to appear in a window of time for the given channel.

11. The method defined in claim 9, wherein the sequence of program listings is determined by category of the program on the given channel.

12. An interactive program guide system implemented on user equipment, the user equipment comprising:
   a user input device configured to receive a first user selection
   a processor configured to, in response to receiving the first user selection:
      determine a scan mode and scan direction based on the first user selection, wherein the scan mode is a channel-wise scan or a time-wise scan; and
      automatically scan a sequence of program listings, wherein the processor is further configured to:
      generate for display a first stationary program listing simultaneously with a first video corresponding to the first stationary program listing for a first period of time, and
      generate for display a second stationary program listing simultaneously with a second video corresponding to the second stationary program listing for a second period of time.

13. The system defined in claim 12, wherein the first user selection generates a start scan command, and wherein the processor is further configured to initiate the automatically scanning the sequence in response to the start scan command.

14. The system defined in claim 12, wherein the user input device is further configured to receive a user input of a stop scan command, wherein the processor is further configured to terminate the automatically scanning the sequence in response to the stop scan command.

15. The system defined in claim 12, wherein the first and second periods of time that the first and second stationary program listings are generated for display are user definable.

16. The system defined in claim 12, wherein the processor is further configured to generate for display program listings for programs scheduled to appear on a plurality of television channels.

17. The system defined in claim 16, wherein the processor is further configured to generate for display program listings of programs scheduled to appear during a common time period.

18. The system defined in claim 16 wherein the plurality of television channels comprises a sequence of consecutively numbered channels.

19. The system defined in claim 16, wherein the user input device is further configured to receive a second user selection of a desired program in the sequence of program listings, wherein the processor is further configured generate for display the desired program in response to the second user selection.

20. The system defined in claim 12, wherein the first user selection is received while generating a display of a program on a given channel and wherein the sequence of program listings contains programs scheduled to appear on the given channel.

21. The system defined in claim 20, wherein the sequence of program listings contains programs scheduled to appear in a window of time for the given channel.

22. The system defined in claim 20, wherein the sequence of program listings is determined by category of the program on the given channel.

\* \* \* \* \*